US011445205B2

(12) United States Patent
Zhang

(10) Patent No.: US 11,445,205 B2
(45) Date of Patent: Sep. 13, 2022

(54) VIDEO ENCODING METHOD AND APPARATUS, VIDEO DECODING METHOD AND APPARATUS, COMPUTER DEVICE, AND STORAGE MEDIUM

(71) Applicant: Tencent Technology (Shenzhen) Company Limited, Shenzhen (CN)

(72) Inventor: Tao Zhang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 171 days.

(21) Appl. No.: 17/074,477

(22) Filed: Oct. 19, 2020

(65) Prior Publication Data
US 2021/0037251 A1 Feb. 4, 2021

Related U.S. Application Data

(63) Continuation of application No. PCT/CN2019/109341, filed on Sep. 30, 2019.

(30) Foreign Application Priority Data

Oct. 15, 2018 (CN) .......................... 201811198938.3

(51) Int. Cl.
*H04N 19/176* (2014.01)
*G06K 9/62* (2022.01)

(52) U.S. Cl.
CPC ......... *H04N 19/176* (2014.11); *G06K 9/6201* (2013.01); *G06K 9/6288* (2013.01)

(58) Field of Classification Search
CPC .. H04N 19/105; H04N 19/147; H04N 19/176; H04N 19/44; H04N 19/50;
(Continued)

(56) References Cited

U.S. PATENT DOCUMENTS

| | | | |
|---|---|---|---|
| 2009/0116760 A1* | 5/2009 | Boon | H04N 19/46 382/238 |
| 2009/0225847 A1 | 9/2009 | Min et al. | |
| 2011/0007803 A1* | 1/2011 | Karczewicz | H04N 19/105 375/E7.243 |

FOREIGN PATENT DOCUMENTS

| | | |
|---|---|---|
| CN | 101816183 A | 8/2010 |
| CN | 102316317 A | 1/2012 |

(Continued)

OTHER PUBLICATIONS

Extended European Search Report, EP19873683.0, dated Nov. 11, 2021, 10 pgs.

(Continued)

*Primary Examiner* — Maria E Vazquez Colon
(74) *Attorney, Agent, or Firm* — Morgan, Lewis & Bockius LLP

(57) ABSTRACT

This application relates to a video encoding method and apparatus, a video decoding method and apparatus, a computer device, and a storage medium. The computer device obtains a to-be-encoded current encoded block in a current video frame and then obtains a first reference block corresponding to the current encoded block in a reference video frame. Next, the computer device obtains, within the reference video frame, one or more second reference blocks matching the first reference block, the one or more second reference blocks and the first reference block being similar reference blocks. Finally, the computer device encodes the current encoded block according to the first reference block and the one or more second reference blocks, to obtain encoded data.

17 Claims, 10 Drawing Sheets

(58) Field of Classification Search
CPC .... H04N 19/56; H04N 19/567; H04N 19/573; H04N 19/61; G06K 9/6201; G06K 9/6288
See application file for complete search history.

(56) References Cited

FOREIGN PATENT DOCUMENTS

| | | | | |
|---|---|---|---|---|
| CN | 104244002 | A | 12/2014 | |
| CN | 110121073 | A * | 8/2019 | ........... H04N 19/172 |
| EP | 2615832 | A1 | 7/2013 | |
| JP | 5271271 | B2 | 8/2013 | |
| KR | 20130023444 | A | 3/2013 | |
| WO | WO 2007125856 | A1 | 11/2007 | |
| WO | WO 2009126260 | A1 | 10/2009 | |
| WO | WO 2012090425 | A1 | 7/2012 | |

OTHER PUBLICATIONS

Tencent Technology, ISR, PCT/CN2019/109341, Dec. 27, 2019, 2 pgs.
Tencent Technology, WO, PCT/CN2019/109341, Dec. 27, 2019, 4 pgs.
Tencent Technology, IPRP, PCT/CN2019/109341, Apr. 14, 2021, 5 pgs.

* cited by examiner

VIDEO ENCODING METHOD AND APPARATUS, VIDEO DECODING METHOD AND APPARATUS, COMPUTER DEVICE, AND STORAGE MEDIUM

CROSS REFERENCE TO RELATED APPLICATIONS

This application is a continuation application of PCT Patent Application No. PCT/CN2019/109341, entitled "VIDEO ENCODING AND VIDEO DECODING METHODS, APPARATUS, COMPUTER DEVICE, AND STORAGE MEDIUM" and filed on Sep. 30, 2019, which claims priority to Chinese Patent Application No. 201811198938.3, filed with the State Intellectual Property Office of the People's Republic of China on Oct. 15, 2018, and entitled "VIDEO ENCODING METHOD AND APPARATUS, VIDEO DECODING METHOD AND APPARATUS, COMPUTER DEVICE, AND STORAGE MEDIUM", all of which are incorporated herein by reference in their entirety.

FIELD OF THE TECHNOLOGY

This application relates to the field of computer technologies, and in particular, to a video encoding method and apparatus, a video decoding method and apparatus, a computer device, and a storage medium.

BACKGROUND OF THE DISCLOSURE

With the rapid development and wide application of multimedia technologies and network technologies, a large amount of video information is used in people's daily life and production activities. To reduce a quantity of transmitted data or stored data of videos, video compression encoding is required. Currently, for a complex encoded block, video encoding quality of performing encoding by using a conventional video encoding method is poor.

SUMMARY

Based on this, embodiments of this application provide a video encoding method and apparatus, a video decoding method and apparatus, a computer device, and a storage medium, which can be used for resolving the foregoing problem of poor video encoding quality and other technical problems.

A video encoding method is provided, applied to a computer device, the method including: obtaining a to-be-encoded current encoded block in a current video frame; obtaining a first reference block corresponding to the current encoded block in a reference video frame; obtaining, within the reference video frame, one or more second reference blocks matching the first reference block, the one or more second reference blocks and the first reference block being similar reference blocks; and encoding the current encoded block according to the first reference block and the one or more second reference blocks, to obtain encoded data.

A video encoding apparatus is provided, and includes: an encoded block obtaining module, configured to obtain a to-be-encoded current encoded block in a current video frame; an encoding reference block obtaining module, configured to obtain a first reference block corresponding to the current encoded block; an encoding reference block matching module, configured to obtain one or more second reference blocks matching the first reference block, the one or more second reference blocks and the first reference block being similar reference blocks; and an encoding module, configured to encode the current encoded block according to the first reference block and the one or more second reference blocks, to obtain encoded data.

A computer device is provided, and includes a memory and a processor, the memory storing a plurality of computer programs, the computer programs, when executed by the processor, causing the computer device to perform the following operations: obtaining a to-be-encoded current encoded block in a current video frame; obtaining a first reference block corresponding to the current encoded block in a reference video frame; obtaining, within the reference video frame, one or more second reference blocks matching the first reference block, the one or more second reference blocks and the first reference block being similar reference blocks; and encoding the current encoded block according to the first reference block and the one or more second reference blocks, to obtain encoded data.

A non-transitory computer-readable storage medium is provided, and stores a plurality of computer programs, the computer programs, when executed by a processor of a computer device, causing the computer device to perform the operations in the foregoing video encoding method.

In the foregoing video encoding method and apparatus, the computer device, and the storage medium, during encoding, one or more matching second reference blocks are obtained based on a first reference block, and the one or more second reference blocks and the first reference block are similar reference blocks, so as to obtain a plurality of reference blocks matching a current encoded block. Encoding based on the plurality of matching reference blocks can improve a matching degree between the reference blocks and the current encoded block, to reduce a predicted residual, thereby improving video encoding quality.

BRIEF DESCRIPTION OF THE DRAWINGS

FIG. 5B is a schematic diagram of performing image fusion according to a first reference block and one or more second reference blocks, to obtain a first fused reference block according to an embodiment.

DESCRIPTION OF EMBODIMENTS

To make objectives, technical solutions, and advantages of this application clearer and more understandable, this application is further described in detail below with reference to the accompanying drawings and the embodiments. It is to be understood that the specific embodiments described herein are merely used for explaining this application, and are not intended to limit this application.

It may be understood that the terms "first", "second" and the like used in this application may be used for describing various elements in this specification. However, the elements are not limited by the terms unless otherwise specified. The terms are merely used for distinguishing a first element from another element. For example, without departing from the scope of this application, a first rate-distortion cost may be referred to as a second rate-distortion cost, and similarly, the second rate-distortion cost may be referred to as the first rate-distortion cost.

Figure 1:
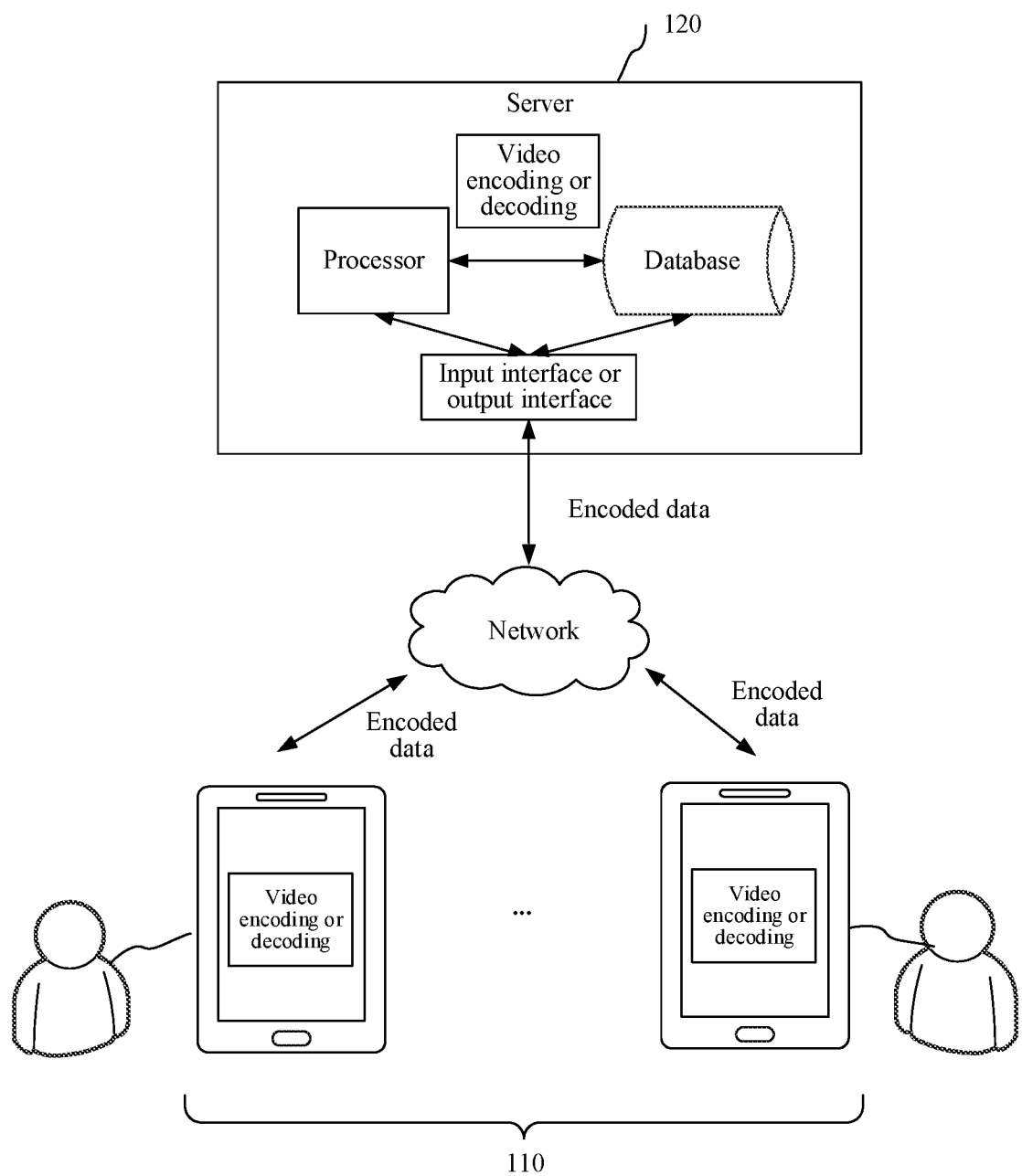
FIG. 1 is a diagram of an application environment of a video encoding method according to an embodiment.

FIG. 1 is a diagram of an application environment of a video encoding method and a video decoding method according to an embodiment. As shown in FIG. 1, the application environment includes a terminal 110 and a server 120. The terminal 110 may perform video encoding by using an encoder, or perform video decoding by using a decoder. The terminal 110 may alternatively perform video encoding by using a processor running a video encoding program, or perform video decoding by using a processor running a video decoding program.

The server 120 may also perform video encoding by using an encoder, or perform video decoding by using a decoder; or perform video encoding by using a processor running a video encoding program, or perform video decoding by using a processor running a video decoding program.

For example, after receiving, through an input interface, encoded data transmitted by the terminal 110, the server 120 may directly transfer the encoded data to the processor for decoding, or may store the encoded data in a database for subsequent decoding. Certainly, the server 120 may alternatively transmit, after obtaining encoded data transmitted by the terminal 110, the encoded data to a corresponding receiving terminal for decoding. In another example, after obtaining encoded data by encoding a video frame by using the processor, the server 120 may directly transmit the encoded data to the terminal 110 through an output interface, or may store the encoded data in a database for subsequent transfer.

The terminal 110 and the server 120 may be connected through a network. The terminal 110 may be a desktop terminal or a mobile terminal, and the mobile terminal may be at least one of a mobile phone, a tablet computer, a notebook computer, and the like, but is not limited thereto.

The server 120 may be implemented by an independent server or a server cluster that includes a plurality of servers.

Figure 2:
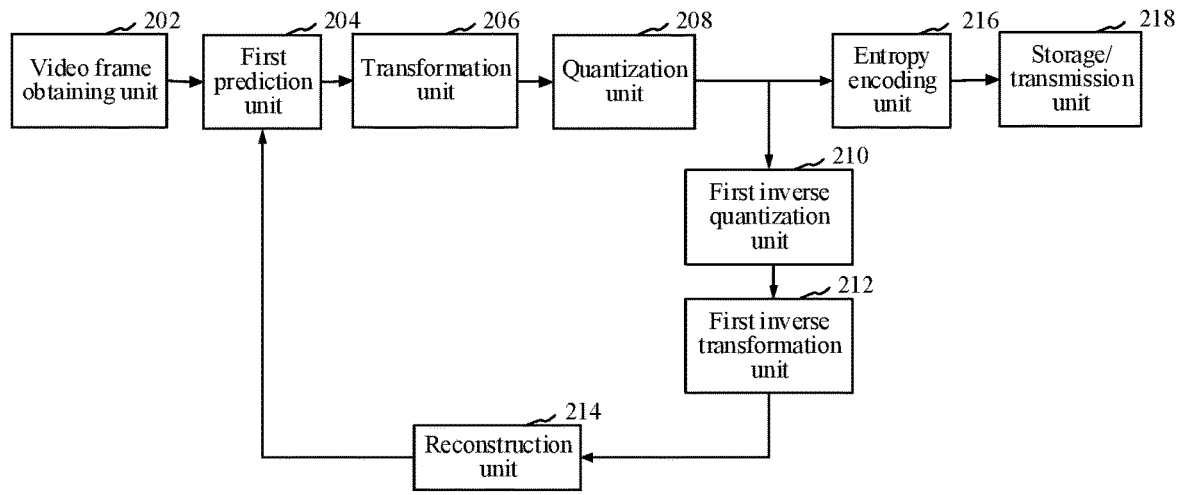
FIG. 2 is an encoding framework diagram corresponding to a video encoding method according to an embodiment.

FIG. 2 is an encoding framework diagram corresponding to a video encoding method according to an embodiment. In the video encoding method provided in this embodiment of this application, video frames of a video sequence may be obtained and encoded, to obtain corresponding encoded data; and one or more steps in storing or transmitting the encoded data are performed by using a storage/transmission unit 218.

A video frame obtaining unit 202 obtains a current video frame. In this application, the current video frame is a video frame currently being processed by the encoder or decoder.

A first prediction unit 204 may perform intra-frame prediction or inter-frame prediction on encoded blocks of the current video frame. For example, when a prediction mode of an encoded block is an inter-frame prediction mode, a predicted value and a corresponding motion vector (MV) are obtained according to an image value of a reference block corresponding to the encoded block, and the predicted value is subtracted from an actual value of the encoded block to obtain a predicted residual. The MV represents a displacement of the encoded block relative to the reference block.

A transformation unit 206 transforms the predicted residual and MV information in a spatial domain to a frequency domain, and may encode a transformation parameter. The transformation method may be discrete Fourier transform, discrete cosine transform, or the like. The MV information may be an actual MV that represents a displacement, or a MV difference (MVD). The MVD is a difference between the actual MV and a predicted MV.

A quantization unit 208 maps transformed data to another value. For example, the transformed data may be divided by a quantization step to obtain a relatively small value. A quantization parameter is a sequence number corresponding to a quantization step, and a value of the quantization parameter is an integer. A corresponding quantization step may be found according to the quantization parameter. A small quantization parameter indicates reservation of most details of an image frame and a high corresponding bit rate. A large quantization parameter indicates a low corresponding bit rate, but a relatively large distortion and not high quality of an image.

A principle of quantization is expressed by using the following formula: FQ=Round(y/Qstep), where y is a predicted residual corresponding to a video frame before quantization, Qstep is a quantization step, and FQ is a quantized value obtained by quantizing y. A Round(x) function means performing rounding off to an even number on a value. To be specific, when a last digit of the value is less than or equal to four, the last digit is rounded down; when the last digit of the value is greater than or equal to six, one is added to a previous digit. When the last digit of the value is five, if there is a digit behind five, five is rounded down and one is added to a previous digit; if there is no digit behind five, and a previous digit of five is an odd number, five is rounded down and one is added to the previous digit; and if a previous digit of five is an even number, five is rounded down without adding anything. A correspondence between the quantization parameter and the quantization step may be set according to a requirement. For example, in some video encoding standards, for brightness encoding, the quantization step has 52 values that are integers from 0 to 51. For chroma encoding, the quantization step has values that are integers from 0 to 39. In addition, the quantization step increases as the quantization parameter increases. Each time the quantization parameter is increased by 6, the quantization step is doubled.

An entropy encoding unit 216 is configured to perform entropy encoding. The entropy encoding is a data encoding manner in which encoding is performed based on an entropy principle without losing any information, and can express particular information by using a relatively small character. An entropy encoding method may be, for example, Shannon encoding or Huffman encoding.

A first inverse quantization unit 210, a first inverse transformation unit 212, and a reconstruction unit 214 are units corresponding to a reconstruction path. A reference frame is obtained through frame reconstruction by using the units of the reconstruction path, to ensure consistency between reference frames in encoding and decoding. A step performed by the first inverse quantization unit 210 is an inverse process of quantization. A step performed by the first inverse transformation unit 212 is an inverse process of transformation performed by the transformation unit 206. The reconstruction unit 214 is configured to add residual data obtained through inverse transformation to predicted data to obtain a reconstructed reference frame.

Figure 3:
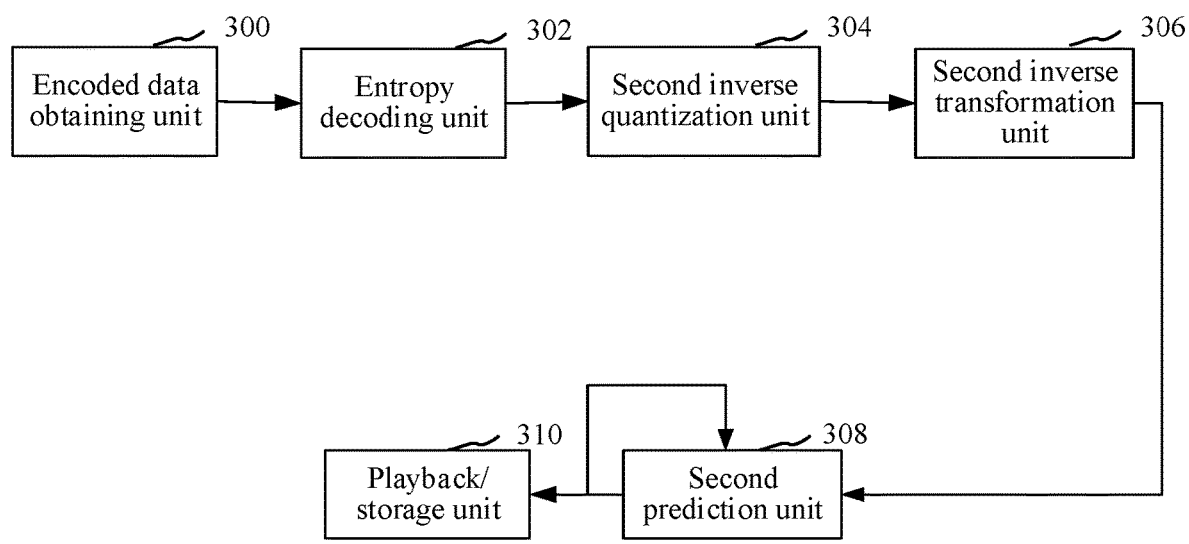
FIG. 3 is a decoding framework diagram corresponding to a video decoding method according to an embodiment.

FIG. 3 is a decoding framework diagram corresponding to a video decoding method according to an embodiment. According to the video decoding method provided in this embodiment of this application, encoded data corresponding to each to-be-decoded video frame of a to-be-decoded video sequence may be obtained by an encoded data obtaining unit 300; after entropy decoding is performed by an entropy decoding unit 302, entropy-decoded data is obtained; a second inverse quantization unit 304 performs inverse quantization on the entropy-decoded data, to obtain inversely quantized data; a second inverse transformation unit 306 performs inverse transformation on the inversely quantized data, to obtain inversely transformed data. The inversely transformed data may be consistent with the data that is obtained after inverse transformation performed by the first inverse transformation unit 212 in FIG. 2.

A second prediction unit 308 performs intra-frame prediction or inter-frame prediction on a to-be-decoded block according to a prediction mode of the to-be-decoded block. For example, when the prediction mode is inter-frame prediction, a target reference block corresponding to the to-be-decoded block is obtained according to MV information carried in the encoded data, a predicted value consistent with that in FIG. 2 is obtained according to an image value of the target reference block, and a pixel value of a decoded video data block is obtained according to the predicted value and a predicted residual in the encoded data. A reference block is obtained from a reference frame obtained through decoding performed by the second prediction unit 308. A playback/storage unit 310 may perform one or more steps in video playing and video storage on a video frame obtained through decoding.

It may be understood that the foregoing encoding framework diagram and decoding framework diagram are merely an example, and do not constitute a limitation to the encoding method to which the solutions of this application are applied. Specific encoding framework diagram and decoding framework diagram may include more or fewer units than those shown in the figures, or combine some units, or have a different component unit deployment. For example, loop filtering may also be performed on the reconstructed video frame, to reduce blocking artifacts of the video frame, thereby improving video quality.

In the embodiments of this application, an end performing encoding is referred to as an encoder side, and an end performing decoding is referred to as a decoder side. The encoder side and the decoder side may be the same end or different ends. The foregoing computer device, for example, a terminal and a server, may be an encoder side, or may be a decoder side.

Figure 4A:
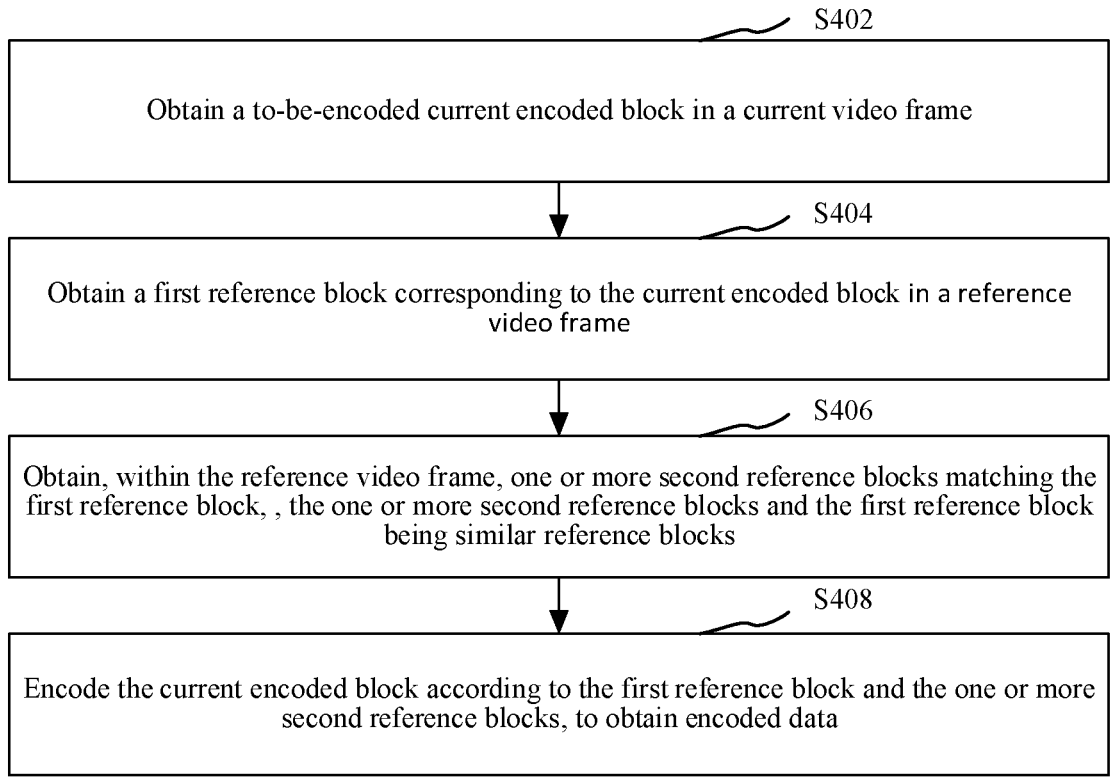
FIG. 4A is a flowchart of a video encoding method according to an embodiment.

As shown in FIG. 4A, in an embodiment, a video encoding method is provided. The video encoding method provided in this embodiment may be applied to the terminal 110 and the server 120 in the foregoing FIG. 1. The method may include the following steps:

Step S402: Obtain a to-be-encoded current encoded block in a current video frame.

Figure 4B:
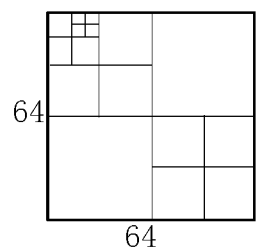
FIG. 4B is a schematic diagram of division of an image block according to an embodiment.

A video frame is a unit forming a video. The video frame may be a video frame collected by a computer device in real time, for example, a video frame obtained in real time by a camera of a terminal, or a video frame corresponding to a prestored video sequence. One video may be regarded as one video frame sequence, and one video frame sequence may include a plurality of video frames. The current video frame is a video frame needing to be encoded currently, and may be any video frame in a plurality of video frames. The current encoded block is an encoded block needing to be encoded currently in the current video frame. The video frame may include one or more encoded blocks, and sizes of the encoded blocks in the video frame may be set according to a requirement or obtained through calculation. For example, one video frame may be divided into a plurality of encoded blocks of a size of 8*8 pixels. The sizes of the encoded blocks in the video frame may alternatively be obtained by calculating rate-distortion costs corresponding to division manners of various encoded blocks, and a division manner corresponding to a low rate-distortion cost is selected for division of the encoded blocks. FIG. 4B is a schematic diagram of division of an image block of 64*64 pixels. One block represents one encoded block. It can be learned from FIG. 4B that sizes of encoded blocks may include 32*32 pixels, 16*16 pixels, 8*8 pixels, and 4*4 pixels. Certainly, the sizes of the encoded blocks may alternatively be other sizes, for example, 32*16 pixels or 64*64 pixels.

Step 404: Obtain a first reference block corresponding to the current encoded block.

The first reference block is obtained from a reference video frame, and is a reference block matching the current encoded block. During video encoding, a block matching the current encoded block, that is, a reference block, needs to be found in the reference frame according to a motion search algorithm, and the current encoded block is encoded according to the reference block.

The motion search algorithm may be, for example, one or more of a full search algorithm and partial search algorithms. The partial search algorithms may be, for example, one or more of a two-dimensional logarithmic search algorithm, a diamond search algorithm, and a hexagonal search algorithm.

The first reference block may be a reference block obtained through unidirectional prediction, or may be a reference block obtained through bidirectional prediction. A frame prediction type corresponding to the video frame may be determined according to an encoding algorithm. The frame prediction type may be an I frame, a P frame, or a B frame, where the I frame is an intra-predicted frame, the P frame is a forward predicted frame, and the B frame is a bidirectional predicted frame. Encoded blocks of the P frame and the B frame may be encoded by using an intra-frame prediction manner or an inter-frame prediction manner. It may be understood that during video encoding, to maintain consistency between a reference frame of an encoder side and a reference frame of a decoder side, the reference block is obtained from a reference frame obtained through reconstruction after encoding performed on the encoder side.

In an embodiment, the first reference block is obtained according to a difference degree when compared with the current encoded block, and a block having a minimum difference degree in the reference frame may be selected as the first reference block. For example, the corresponding first reference block may be obtained according to one or more of a sum of squares for error (SSE), a sum of absolute difference (SAD), a mean absolute difference (MAD), and a mean squared error (MSE) between the current encoded block and a corresponding image block of the reference frame. For example, in image blocks of the reference frame, an image block of which an SSE value with the current encoded block is smallest, or an image block of which a sum of an SSE value and a SAD value with the current encoded block is smallest is used as the first reference block. A calculation formula of the SSE may be shown as formula (1). $SSE_P$ represents an SSE between a current encoded block C and an image block P in the reference frame; $C(i, j)$ represents a pixel point in an $i^{th}$ row and a $j^{th}$ column of the current encoded block; $P(i, j)$ represents a pixel point in an $i^{th}$ row and a $j^{th}$ column of the image block P of the reference frame; m represents a quantity of rows of pixel points in the image block; and n represents a quantity of columns of pixel points in the image block.

$$SSE_P = \sum_{i=1, j=1}^{i=m, j=n} (C(i, j) - P(i, j))^2 \quad (1)$$

The video encoding method provided in this embodiment of this application is applied to inter-frame prediction, and may also be applied to intra-frame prediction. If the video encoding method is applied to intra-frame prediction, an image block may be obtained from image blocks in the current video frame that have been encoded and reconstructed as the first reference block. The first reference block may be obtained according to a preset position. For example, a reconstructed image block in the current video frame and adjacent to the current encoded block may be used as the first reference block. If the video encoding method is applied to inter-frame prediction, when obtaining the current encoded block, motion search may be performed in a corresponding reference frame, to obtain the current encoded block.

In an embodiment, a current prediction mode of the current encoded block may be obtained. If the current prediction mode is an inter-frame prediction mode, the video encoding method provided in this embodiment of this application is performed; and if the current prediction mode is an intra-frame prediction mode, encoding is performed by using a video encoding method corresponding to intra-frame prediction.

Step S406: Obtain, within the reference video frame, one or more second reference blocks matching the first reference block. In some embodiments, there are multiple reference video frames such that the second reference blocks matching the first reference block may come from different reference video frames.

The second reference blocks are reference blocks within the reference video frame matching the first reference block, and are obtained through matching based on the first reference block and by using a matching algorithm. The first reference block and the second reference blocks are similar reference blocks. A standard of whether it is matched may be set according to a requirement, and may be, for example, that a difference degree between the first reference block and the second reference block is less than a preset value. A quantity of the second reference blocks may be set according to a requirement, for example, set to 4.

In an embodiment, a matching algorithm used on the encoder side is consistent with that used on the decoder side, and one or more second reference blocks matching the first reference block are obtained according to the matching algorithm consistent with that of the decoder side. That is, the decoder side may obtain the same second reference block according to the same matching algorithm. In this way, the first reference block may also be obtained on the decoder side, so that the encoder side does not need to transmit MV information of the second reference block, and the decoder side may also obtain the second reference block according to the first reference block and the consistent matching algorithm, thereby reducing a data volume of the encoded data when a plurality of reference blocks are used for video encoding.

In an embodiment, that the matching algorithms of the encoder side and the decoder side are consistent means that reference regions from which the second reference blocks are obtained are consistent and rules for calculating whether it is matched are consistent. For example, the reference regions may include one or more of a reference video frame at which the first reference block is located and a previous video frame of the reference video frame.

In an embodiment, the reference regions may be further preset regions in the video frame. The preset regions may include, for example, one or more of regions of which distances to the first reference block and to the current encoded block are less than a preset distance. For example, the reference region may be a region corresponding to a square using a position of the first reference block as a center and having a side length of 100 pixels.

In an embodiment, the rules for calculating whether it is matched may include one or more of: a difference degree with the first reference block in the reference region being lower than a preset difference degree, and the difference degree ranking being within a preset ranking when ranked in ascending order. The preset difference degree and the preset ranking may be set according to a requirement. For example, the preset difference degree may be 100. 3 image blocks that are in the reference regions and have a minimum difference degree with the first reference block may alternatively be set as the second reference blocks.

In an embodiment, the obtaining one or more second reference blocks matching the first reference block includes: obtaining a plurality of candidate reference blocks corresponding to the first reference block; calculating first difference degrees between the first reference block and the candidate reference blocks; and obtaining, according to the first difference degrees and from the plurality of candidate reference blocks, one or more second reference blocks matching the first reference block.

A difference degree is used for measuring a degree of a difference between image blocks. A lower difference degree indicates more similar image blocks. A difference degree and a similarity degree can be used for measuring whether images are similar. A lower difference degree indicates more similar images; and a higher similarity degree indicates more similar images. The difference degree and the similarity degree may be in a negative correlation. That is, a high difference degree indicates a low similarity degree. The similarity degree can be calculated according to the difference degree, and the difference degree can also be calculated according to the similarity degree. For example, a reciprocal of the difference degree may be the similarity degree. In an embodiment, after normalization is performed on a difference degree and a similarity degree, a sum of the difference degree and the similarity degree may be 1. For example, if the similarity degree is 0.9, the difference degree is 0.1.

A method for calculating the second reference blocks matching the first reference block may be represented by using a difference degree. The difference degree may be represented by using one or more of an SSE, a SAD, a MAD, and an MSE. For example, a calculation formula of an SSE between a first reference block $P_0$ and each of candidate reference blocks in a reference region may be shown in a formula (2). $SSE_1$ represents an SSE between the first reference block $P_0$ and a candidate reference block H; $P_0(i, j)$ represents a pixel point in an $i^{th}$ row and a $j^{th}$ column of the first reference block; $H(i, j)$ represents a pixel point in an $i^{th}$ row and a $j^{th}$ column of the candidate reference block H; m represents a quantity of rows of pixel points in an image block; and n represents a quantity of columns of pixel points in the image block. After first difference degrees with the candidate reference blocks are obtained, the one or more second reference blocks are obtained through screening according to the first difference degree. For example, the second reference blocks may be obtained through screening according to one or more rules of: a difference degree with the first reference block in the reference region being lower than a preset difference degree, and the difference degree ranking being within a preset ranking when ranked in ascending order.

$$SSE1 = \sum_{i=1,j=1}^{i=m,j=n} (P_0(i, j) - H(i, j))^2 \qquad (2)$$

Step S408: Encode the current encoded block according to the first reference block and the one or more second reference blocks, to obtain encoded data.

After the first reference block and the one or more second reference blocks are obtained, the current encoded block is encoded based on the first reference block and the one or more second reference blocks. A predicted value of the current encoded block may be obtained based on the first reference block and the one or more second reference blocks, and one or more steps of transformation, quantization, and entropy encoding are performed according to a predicted residual, to obtain the encoded data.

The transformation means transforming data in a spatial domain to a frequency domain, to encode a transformation coefficient. The transformation method may be discrete Fourier transform, discrete cosine transform, or the like. The quantization means mapping data, such as transformed data, to another value. For example, the transformed data may be divided by a quantization step to obtain a relatively small value. The entropy encoding is a data encoding manner in which encoding is performed based on an entropy principle without losing any information, and can express particular information by using a relatively small character. An entropy encoding method may be, for example, Shannon encoding or Huffman encoding.

In an embodiment, the encoded data carries the MV information of the first reference block. An MV represents a displacement of an encoded block relative to a reference block. In inter-frame prediction encoding, an MV may be used for representing a relative displacement between the current encoded block and a reference block in a reference frame of the current encoded block. First, an MV of the current encoded block may be predicted by using an MV of the reference block, to obtain a corresponding MV prediction (MVP), and then encoding is performed according to a difference between an actual MV corresponding to the current encoded block and the MVP corresponding to the current encoded block, that is, an MVD, so as to effectively reduce a quantity of encoded bits of MV information. On the decoder side, because the encoded data carries the MV information of the first reference block, the first reference block can be obtained according to the MV information, and the corresponding second reference blocks are obtained according to the first reference block. Therefore, decoding is performed according to the first reference block and the second reference blocks, to obtain a decoded image.

In a video encoding method provided in the related art, a reference block corresponding to a current encoded block is usually obtained, and encoding is performed based on the reference block. However, the current encoded block cannot be desirably predicted merely by using one reference block, which affects prediction performance and causes poor video encoding quality. Nevertheless, during encoding in the foregoing video encoding method, one or more matching second reference blocks are obtained based on a first reference block, and the one or more second reference blocks and the first reference block are similar reference blocks, so as to obtain a plurality of reference blocks matching a current encoded block. Encoding based on the plurality of matching reference blocks can improve a matching degree between the reference blocks and the current encoded block, to reduce a predicted residual, thereby improving video encoding quality.

In an embodiment, after the encoded data is obtained, one or more of steps such as transmitting and storing the encoded data may be further performed. For example, when making a video call, encoded data is transmitted to another computer device making the video call. A video web site server may transmit encoded data to a terminal needing to play a video. After receiving the encoded data, the terminal performs decoding to obtain a decoded video frame and plays the video frame.

In an embodiment, step S408, that is, the encoding the current encoded block according to the first reference block and the one or more second reference blocks, to obtain encoded data includes: obtaining a fused reference block set, and encoding the current encoded block according to the first reference block and the fused reference block set, to obtain the encoded data.

The fused reference block set may include reference blocks obtained through image fusion according to the first reference block and the second reference blocks, and one or more of reference blocks obtained through fusion according to the plurality of second reference blocks. That is, reference blocks in fused reference blocks may include the reference blocks obtained through image fusion according to the first reference block and the second reference blocks, and may also include the reference blocks obtained through image fusion according to the plurality of second reference blocks. After the fused reference block set is obtained, fused reference blocks may be screened from the fused reference block set for encoding.

In an embodiment, the fused reference block may be selected according to one or more of a rate-distortion cost and a difference degree between a fused reference block and a current encoded block that correspond to encoding by using a fused reference block. For example, a fused reference block corresponding to a lowest rate-distortion cost or a lowest difference degree may be selected for encoding. The encoded data may carry reference block mode information corresponding to a target reference block, and the reference block mode information is used for representing information about the used target reference block.

In an embodiment, a fused reference block in the fused reference block set or the first reference block may alternatively be used as the target reference block, and encoding is performed according to the target reference block. For example, the target reference block may be selected from the fused reference block set and the first reference block according to one or more of the rate-distortion cost and the difference degree.

In an embodiment, when there are a plurality of second reference blocks, the encoding the current encoded block according to the first reference block and the one or more second reference blocks, to obtain encoded data includes: performing image fusion according to the plurality of second reference blocks, to obtain a second fused reference block; and selecting a target reference block from the second fused reference block and the first reference block, and encoding the current encoded block according to the target reference block, to obtain the encoded data, the encoded data carrying reference block mode information corresponding to the target reference block.

The second fused reference block is obtained through fusion according to the plurality of second reference blocks. A fusion manner may be, for example, performing weighted summation on pixel values of the same positions of the plurality of second reference blocks, to obtain a pixel value of a corresponding position of the second fused reference block, so as to constitute the second fused reference block according to pixel values of a plurality of positions.

In an embodiment, a weight corresponding to the second reference block may be set according to a requirement. For example, a weight corresponding to the second reference block is a reciprocal of a quantity of reference blocks that are fused. The weight corresponding to the second reference block may alternatively be determined according to a distance between the second reference block and the current encoded block. The weight corresponding to the second reference block and the distance between the second reference block and the current encoded block are in a negative correlation. That is, a larger distance between the second reference block and the current encoded block indicates a smaller weight corresponding to the second reference block. For example, the weight corresponding to the second reference block may be obtained through normalization according to a reciprocal of the distance. The reference block mode information is used for describing a type of the target reference block adopted for the current encoded block, for example, whether the target reference block is the second fused reference block or the first reference block.

Figure 5A:
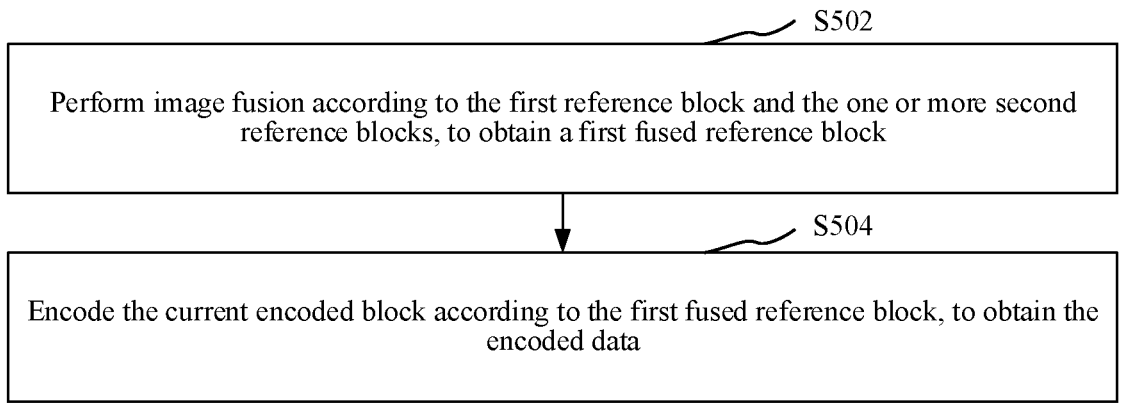
FIG. 5A is a flowchart of encoding a current encoded block according to a first reference block and one or more second reference blocks, to obtain encoded data according to an embodiment.

In an embodiment, as shown in FIG. 5A, step S408, that is, the encoding the current encoded block according to the first reference block and the one or more second reference blocks, to obtain encoded data includes the following steps:

Step S502: Perform image fusion according to the first reference block and the one or more second reference blocks, to obtain a first fused reference block.

Image fusion means that information about a plurality of images is fused, so that an image obtained through fusion includes more useful information, and can be processed more conveniently. The first fused reference block is obtained through fusion according to the first reference block and the one or more second reference blocks. A fusion manner may be, for example, performing weighted summation on pixel values of the same positions of the first reference block and the one or more second reference blocks, to obtain a pixel value of a corresponding position of the first fused reference block, so as to constitute the first fused reference block according to pixel values of a plurality of positions.

In an embodiment, the performing image fusion according to the first reference block and the one or more second reference blocks, to obtain a first fused reference block includes: obtaining weighting weights that correspond to the first reference block and the one or more second reference blocks; and weighting the first reference block and the one or more second reference blocks according to the weighting weights, to obtain the first fused reference block.

Weighting weights that correspond to the first reference block and the one or more second reference blocks may be set according to a requirement. For example, if there are 4 second reference blocks, a weighting weight of the first reference block may be set to 0.6, and a weighting weight of each of the second reference blocks may be set to 0.1. The weighting weights of the reference blocks may also be obtained according to distances to the current encoded block. The weighting weights are in an inverse proportion to the distances to the current encoded block. That is, a longer distance indicates a smaller corresponding weighting weight. For example, the weighting weights may be obtained after performing normalization on reciprocals of distances between the first reference block as well as the second reference blocks and the current encoded block. After the weighting weights are obtained, weighted summation is performed by using the weighting weights and the corresponding reference blocks, to obtain the corresponding first fused reference block.

For example, a calculation method for the first fused reference block may be represented by using a formula (3), where Pw represents the first fused reference block, P0 is the first reference block, W0 is a weighting weight of the first reference block, P1 to Pn are the second reference blocks, W1 is a weighting weight of the second reference block P1, Wn is a weighting weight of the second reference block Pn, and n represents a quantity of the second reference blocks. A sum of weighting weights that correspond to the first reference block and the second reference blocks is 1, that is, $W0+W1+\ldots+Wn=1$.

$$Pw=(P0*W0+P1*W1+\ldots+Pn*Wn) \quad (3)$$

In an actual example, as shown in FIG. 5B, it is assumed that a video frame image is a grayscale image; the first reference block P0 includes 2*2 pixels, and a corresponding weight is 0.8; and there is one second reference block P1, including 2*2 pixels, and a corresponding weight is 0.2. Therefore, weighted summation may be performed on pixel values of P0 and pixel values on the same positions of P1, to obtain Pw.

In an embodiment, weights of the second reference blocks may be obtained according to one or more of difference degrees between the second reference blocks and the first reference block and difference degrees between the second reference blocks and the current encoded block. For example, target difference degrees may be obtained according to the difference degrees between the second reference blocks and the first reference block and the difference degrees between the second reference blocks and the current encoded block, and the weighting weights are obtained according to the target difference degrees. The target difference degrees may be sums of the difference degrees between the second reference blocks and the first reference block and the difference degrees between the second reference blocks and the current encoded block. The weighting weights corresponding to the second reference blocks and the target difference degrees are in a negative correlation. That is, a higher target difference degree indicates a smaller weighting weight. When the weighting weights corresponding to the second reference blocks are calculated according to the difference degrees between the second reference blocks and the current encoded block, there is a loss of the current encoded block during encoding, that is, an image block obtained through decoding on the decoder side is an image block having a distortion. Therefore, the weighting weights corresponding to the second reference blocks may be carried in the encoded data, so that the decoder side can extract the weighting weights of the second reference blocks from the encoded data. The first fused reference block is obtained through calculation according to the weighting weight of the first reference block and the weighting weights of the second reference blocks, and decoding is performed according to the first fused reference block.

In an embodiment, the obtaining weighting weights that correspond to the first reference block and the one or more second reference blocks includes: calculating second difference degrees between the one or more second reference blocks and the first reference block; and obtaining weighting weights corresponding to the one or more second reference blocks according to the second difference degrees, where the weighting weights corresponding to the one or more second reference blocks and the corresponding second difference degrees are in a negative correlation.

The second difference degree between the second reference block and the first reference block may be represented by using one or more of an SSE, a SAD, a MAD, and an MSE between the second reference block and the first reference block. That the weighting weights corresponding to the second reference blocks and the corresponding second difference degrees are in a negative correlation means that higher second difference degrees indicate smaller weighting weights corresponding to the corresponding second reference blocks.

In an embodiment, the weighting weight corresponding to the first reference block may be a preset weight, for example, 0.6. The weighting weights corresponding to the second reference blocks are calculated according to the corresponding second difference degrees. For example, the weighting weights corresponding to the second reference blocks are obtained after normalization is performed based on reciprocals of the corresponding second difference degrees. Assuming that there are two second reference blocks: P1 and P2, an SSE corresponding to P1 with the first reference block is 100, an SSE corresponding to P2 with the first reference block is 300, and the weighting weight corresponding to the first reference block is 0.6, a weighting weight corresponding to P1 is: 0.4*(1/100+(1/100+1/300)=0.3, and a weighting weight corresponding to P2 is: 0.4*(1/300+(1/100+1/300)=0.1.

Step 504: Encode the current encoded block according to the first fused reference block, to obtain the encoded data.

After the first fused reference block is obtained, a pixel value of the first fused reference block may be used as the predicted value of the current encoded block, and the predicted residual is obtained according to a difference between an actual value and the predicted value of the current encoded block. The predicted residual and the MV information corresponding to the first reference block are encoded, to obtain the encoded data.

In this embodiment of this application, a prediction block matching the current encoded block can be obtained by using the first fused reference block as a prediction block for encoding, so that the predicted residual can be reduced, thereby reducing a data volume of the encoded data, and improving encoding quality.

Figure 6:
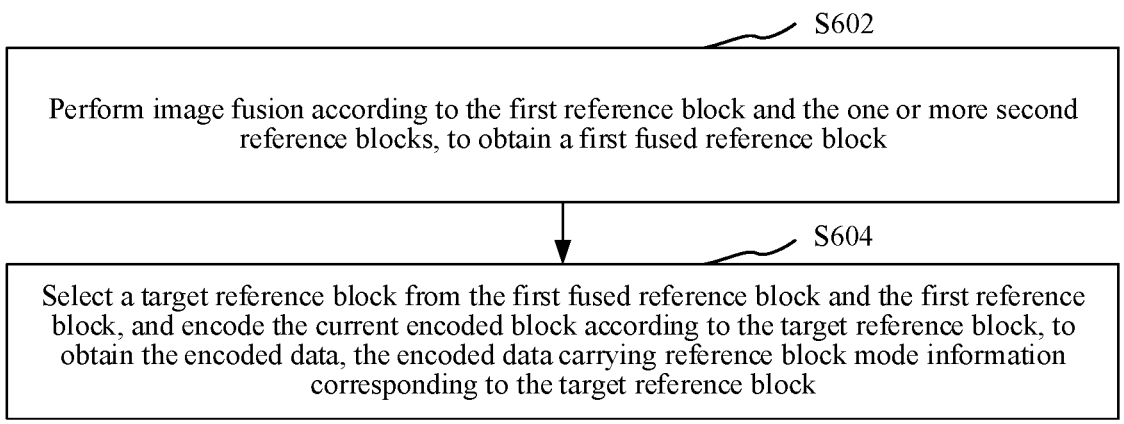
FIG. 6 is a flowchart of encoding a current encoded block according to a first reference block and one or more second reference blocks, to obtain encoded data according to an embodiment.

As shown in FIG. 6, step S408, that is, the encoding the current encoded block according to the first reference block and the one or more second reference blocks, to obtain encoded data includes the following steps:

Step S602: Perform image fusion according to the first reference block and the one or more second reference blocks, to obtain a first fused reference block.

For step S602, that is, the performing image fusion according to the first reference block and the one or more second reference blocks, to obtain a first fused reference block, reference may be made to the description of step 502. Details are not described herein again.

Step S604: Select the target reference block from the first fused reference block and the first reference block, and encode the current encoded block according to the target reference block, to obtain the encoded data, the encoded data carrying reference block mode information corresponding to the target reference block.

The reference block mode information is used for describing a type of the target reference block adopted for the current encoded block, namely, whether the target reference block is the first fused reference block or the first reference block. The computer device may add a flag bit multi_prediction_flag describing the reference block mode information to the encoded data, that is, add a syntactic element describing the reference block mode information to the encoded data.

The syntactic element refers to one or a series of elements that are carried in the encoded data and used for representing particular meanings. A value of the flag bit corresponding to the reference block mode information may be set according to a requirement. For example, when the target reference block is the first fused reference block, corresponding multi_prediction_flag may be 0. When the target reference block is the first reference block, corresponding multi_prediction_flag may be 1.

In an embodiment, the reference block mode information is added to header information corresponding to a prediction unit (PU). Therefore, during encoding, the reference block mode information corresponding to the current encoded block may be added to the header information corresponding to the PU. One of the first fused reference block and the first reference block is selected as the target reference block, and the predicted value of the current encoded block is obtained according to a pixel value of the target reference block. The predicted residual is obtained according to the difference between the actual value and the predicted value of the current encoded block, and the predicted residual, the MV information corresponding to the first reference block, and the reference block mode information are encoded, to obtain the encoded data.

When the target reference block is selected, the selection may be made according to a video encoding requirement. In an embodiment, the selection may be made according to one or more of a difference degree between a reference block and the current encoded block and a rate-distortion cost of encoding. For example, if both a difference degree between the first fused reference block and the current encoded block and a difference degree between the first reference block and the current encoded block are lower than a preset difference degree, a reference block corresponding to a lower rate-distortion cost is selected from the first fused reference block and the first reference block as the target reference block. If both the difference degree between the first fused reference block and the current encoded block and the difference degree between the first reference block and the current encoded block are higher than the preset difference degree, a reference block corresponding to a lower difference degree is selected from the first fused reference block and the first reference block as the target reference block.

In this embodiment of this application, the target reference block is selected from the first fused reference block and the first reference block, so that a reference block better matching the current encoded block can be obtained for encoding. Therefore, encoding quality can be improved.

In an embodiment, the encoded data carries the MV information of the first reference block. If the first reference block is used as the target reference block, during decoding on the decoder side, the first reference block is obtained according to the MV information, and is used as the target reference block for decoding. If the first fused reference block is used as the target reference block, during decoding on the decoder side, the first reference block is obtained according to the MV information, and the second reference blocks matching the first reference block are obtained according to the consistent matching algorithm. The first fused reference block is obtained according to the first reference block and the second reference blocks, and decoding is performed by using the first fused reference block.

Figure 7:
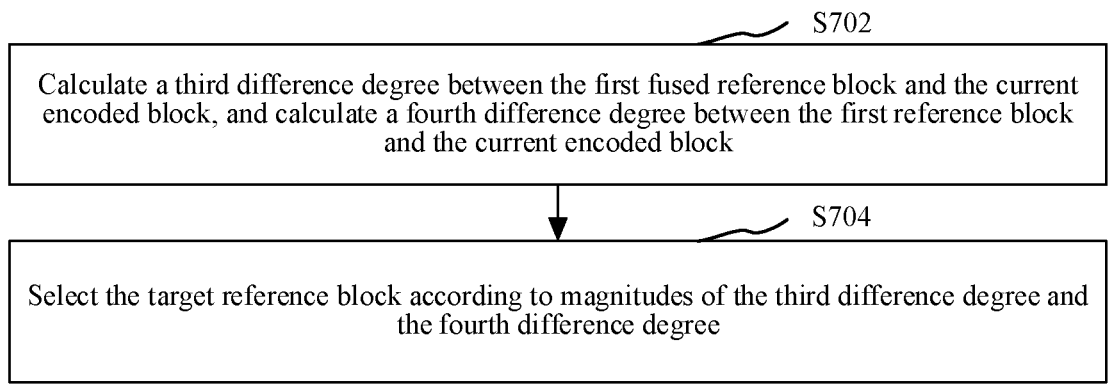
FIG. 7 is a flowchart of selecting a target reference block from a first fused reference block and a first reference block according to an embodiment.

In an embodiment, as shown in FIG. 7, the selecting the target reference block from the first fused reference block and the first reference block includes the following steps:

Step S702: Calculate a third difference degree between the first fused reference block and the current encoded block, and calculate a fourth difference degree between the first reference block and the current encoded block.

The third difference degree and the fourth difference degree may also be represented by using one or more of an SSE, a SAD, a MAD, and an MSE. It may be understood that the third difference degree and the fourth difference degree are calculated by using the same difference degree calculation method. For example, if the third difference degree is represented by using an SSE, the fourth difference degree is also represented by using an SSE. The calculation method for the third difference degree between the first fused reference block and the current encoded block may be represented by using a formula (4), where SSEw represents an SSE between a current encoded block C and a first fused reference block Pw, Pw(i, j) represents a pixel point in an ith row and a jth column of the first fused reference block Pw, C(i, j) represents a pixel point in an ith row and a jth column of the current encoded block, m represents a quantity of rows of pixel points in an image block, and n represents a quantity of columns of pixel points in the image block.

$$SSE_W = \sum_{i=1, j=1}^{i=m, j=n} (C(i, j) - P_W(i, j))^2 \quad (4)$$

Step S704: Select the target reference block according to magnitudes of the third difference degree and the fourth difference degree.

After the third difference degree and the fourth difference degree are obtained, the target reference block is selected according to a magnitude relationship between the third difference degree and the fourth difference degree. The selection may be: when a difference obtained by subtracting the third difference degree from the fourth difference degree is less than or equal to a first preset threshold, the first reference block is selected as the target reference block; and when the difference obtained by subtracting the third difference degree from the fourth difference degree is greater than the first preset threshold, the first fused reference block is selected as the target reference block. The first preset threshold may be set according to a requirement, for example, may be 0. The first preset threshold may alternatively be a number from 0 to 100, and may be an integer or a decimal.

For example, the first preset threshold may be set to 0. It may be set that when the difference obtained by subtracting the third difference degree from the fourth difference degree is less than or equal to 0, that is, when the fourth difference degree SSE0 is less than or equal to the third difference degree SSEw, P0, that is, the first reference block is selected as the target reference block; and when the difference obtained by subtracting the third difference degree from the fourth difference degree is greater than 0, that is, when the fourth difference degree SSE0 is greater than the third difference degree SSEw, Pw, that is, the first fused reference block is selected as the target reference block.

$$P = \begin{cases} P_0, & \text{if } SSE_0 <= SSE_w \\ P_w, & \text{if } SSE_0 > SSE_w \end{cases}$$

In this embodiment of this application, the target reference block is selected based on difference degrees, which enables the predicted residual obtained during encoding to be small, and reduces a data volume of the encoded data.

Figure 8:
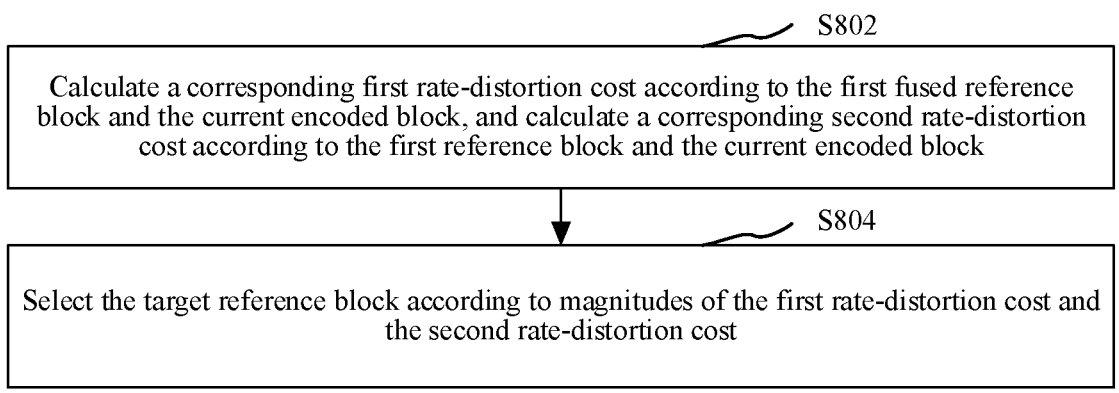
FIG. 8 is a flowchart of selecting a target reference block from a first fused reference block and a first reference block according to an embodiment.

In an embodiment, as shown in FIG. 8, the selecting the target reference block from the first fused reference block and the first reference block includes the following steps:

Step S802: Calculate a corresponding first rate-distortion cost according to the first fused reference block and the current encoded block, and calculate a corresponding second rate-distortion cost according to the first reference block and the current encoded block.

Rate-distortion refers to a mutual relationship between an encoding code rate and an image distortion degree, and may be represented by using a rate-distortion cost calculated based on a preset rate-distortion cost function. A low rate-distortion cost indicates a low distortion degree of a video under a specific code rate limitation. For example, the rate-distortion cost function may be expressed by using J=D+λR, where J represents the rate-distortion cost, D is an estimated value of a distortion degree, R is an estimated value of bits required for encoding, and λ is a Lagrange constant. After the first fused reference block is obtained, the first rate-distortion cost corresponding to a case that the current encoded block is encoded by using the first fused reference block is calculated. After the first reference block is obtained, the second rate-distortion cost corresponding to a case that the current encoded block is encoded by using the first reference block is calculated.

Step S804: Select the target reference block according to magnitudes of the first rate-distortion cost and the second rate-distortion cost.

After the first rate-distortion cost and the second rate-distortion cost are obtained, the target reference block is selected according to a magnitude relationship between the first rate-distortion cost and the second rate-distortion cost.

The selection may be: when a difference obtained by subtracting the first rate-distortion cost from the second rate-distortion cost is less than or equal to a second preset threshold, the first reference block is selected as the target reference block; and when the difference obtained by subtracting the first rate-distortion cost from the second rate-distortion cost is greater than the second preset threshold, the first fused reference block is selected as the target reference block. The second preset threshold may be set according to a requirement, for example, may be 0. The second preset threshold may alternatively be a number from 0 to 3, and may be an integer or a decimal.

For example, the second preset threshold may be set to 0. It may be set that when the difference obtained by subtracting the first rate-distortion cost from the second rate-distortion cost is less than or equal to 0, that is, when the second rate-distortion cost J0 is less than or equal to the first rate-distortion cost Jw, P0, that is, the first reference block is selected as the target reference block; and when the difference obtained by subtracting the first rate-distortion cost from the second rate-distortion cost is greater than 0, that is, when the second rate-distortion cost J0 is greater than the first rate-distortion cost Jw, Pw, that is, the first fused reference block is selected as the target reference block.

$$P = \begin{cases} P_0, & \text{if } J_0 <= J_w \\ P_w, & \text{if } J_0 > J_w \end{cases}$$

In addition, the first preset threshold and the second preset threshold may be the same, or may be different.

In this embodiment of this application, the target reference block is selected based on rate-distortion costs, which can balance the code rate and the distortion degree, and select an optimal encoding parameter for the encoder, thereby implementing efficient encoding.

Figure 9:
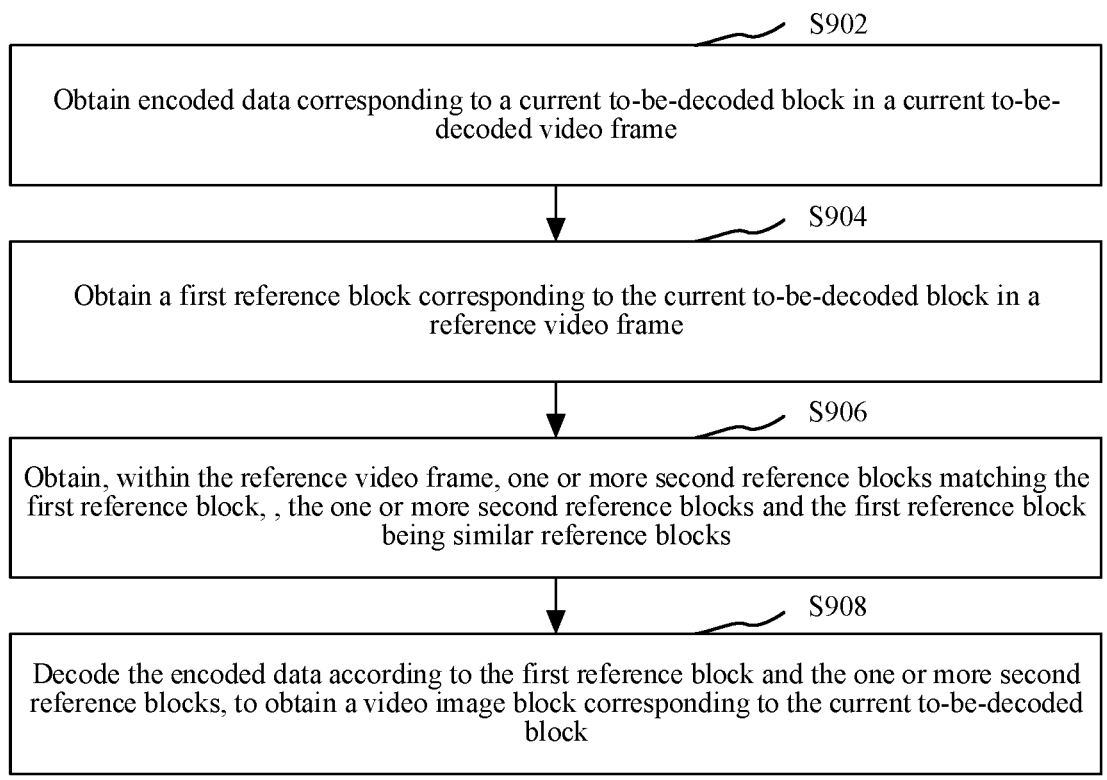
FIG. 9 is a flowchart of a video decoding method according to an embodiment.

As shown in FIG. 9, in an embodiment, a video decoding method is provided. The video decoding method provided in this embodiment may be applied to the terminal 110 and the server 120 in the foregoing FIG. 1. The video decoding method may include the following steps:

Step S902: Obtain encoded data corresponding to a current to-be-decoded block in a current to-be-decoded video frame.

The to-be-decoded video frame is a video frame that needs to be decoded. One to-be-decoded video frame sequence may include a plurality of to-be-decoded video frames. The to-be-decoded video frame may be a video frame obtained in real time, or may be a video frame obtained from a prestored to-be-decoded video frame sequence. The current to-be-decoded video frame refers to a video frame needing to be decoded currently, and the current to-be-decoded block is a to-be-decoded block needing to be decoded currently in the current to-be-decoded video frame. A video frame may include one or more to-be-decoded blocks. It may be understood that during decoding, because encoded blocks and to-be-decoded blocks are in a one-to-one correspondence, the encoded data corresponding to the current to-be-decoded block is encoded data obtained by encoding a corresponding current encoded block. Therefore, sizes of the encoded blocks and the to-be-decoded blocks are consistent, and pixel sizes of the to-be-decoded blocks may also include 32*32 pixels, 16*16 pixels, 8*8 pixels, 4*4 pixels, and the like.

Step 904: Obtain a first reference block corresponding to the current to-be-decoded block.

The first reference block is obtained from a reference frame, and is a reference block matching the current to-be-decoded block. It may be understood that due to consistency between encoding/decoding rules, for a current encoded block and a current to-be-decoded block that correspond to each other, the first reference blocks are the same. The encoded data may carry MV information corresponding to the first reference block. A decoder side may obtain the corresponding first reference block according to the MV information corresponding to the first reference block.

Step S906: Obtain, within the reference video frame, one or more second reference blocks matching the first reference block. In some embodiments, there are multiple reference video frames such that the second reference blocks matching the first reference block may come from different reference video frames.

The second reference blocks are reference blocks matching the first reference block, and are obtained through matching based on the first reference block and by using a preset matching algorithm. The first reference block and the second reference blocks are similar reference blocks. A standard of whether it is matched may be set according to a requirement, and may be, for example, that a difference degree between the first reference block and the second reference block is less than a preset value.

In an embodiment, a matching algorithm used on an encoder side is consistent with that used on the decoder side. That is, the decoder side may obtain the same second reference block according to the same matching algorithm. For example, if the encoder side performs matching in a preset reference region to obtain the second reference blocks, the decoder side also performs matching in a preset reference region to obtain the second reference blocks. In addition, rules for calculating whether it is matched are consistent, so that the second reference blocks obtained on the encoder side and the decoder side are the same.

For a method for obtaining one or more second reference blocks matching the first reference block, reference may be made to the method provided in video encoding. For example, the obtaining one or more second reference blocks matching the first reference block also includes: obtaining a plurality of candidate reference blocks corresponding to the first reference block; calculating first difference degrees between the first reference block and the candidate reference blocks; and obtaining, according to the first difference degrees and from the plurality of candidate reference blocks, one or more second reference blocks matching the first reference block. Details are not described again in this embodiment of this application.

It may be understood that the video decoding method provided in this embodiment of this application is applied to inter-frame prediction, and may also be applied to intra-frame prediction. For example, a matching reference block may be obtained from decoded image blocks in the current to-be-decoded video frame as the first reference block. If the video decoding method is applied to inter-frame prediction, when the current to-be-decoded block is obtained, a current prediction mode of the current to-be-decoded block is obtained. If the current prediction mode is an inter-frame prediction mode, the video decoding method provided in this embodiment of this application is performed; and if the current prediction mode is an intra-frame prediction mode, decoding is performed by using a video decoding method corresponding to intra-frame prediction.

Step S908: Decode the encoded data according to the first reference block and the one or more second reference blocks, to obtain a video image block corresponding to the current to-be-decoded block.

After the first reference block and the one or more second reference blocks are obtained, the encoded data is decoded based on the first reference block and the one or more second reference blocks, to obtain the decoded video image block. For example, a predicted value corresponding to the current to-be-decoded block may be obtained based on the first reference block and the one or more second reference blocks, and a pixel value of the video image block is obtained according to a sum of a predicted residual in the encoded data and the predicted value. A decoding process may be determined according to the encoding process. For example, decoding may further include at least one of inverse transformation, inverse quantization, and entropy decoding.

During decoding in the foregoing video decoding method, one or more matching second reference blocks are obtained based on a first reference block, and the one or more second reference blocks and the first reference block are similar reference blocks, so as to obtain a plurality of reference blocks matching a current encoded block. Decoding the encoded data based on the plurality of matching reference blocks can reduce image block losses, so that video decoding quality is high.

In an embodiment, the video decoding method may further include: reading reference block mode information from the encoded data, and performing step S906 when the reference block mode information represents that decoding is performed by using a fused reference block of a fused reference block set, that is, performing the step of obtaining one or more second reference blocks matching the first reference block, to decode the encoded data according to an obtained fused reference block. If the reference block mode information represents that decoding is performed by using the first reference block, the encoded data is decoded according to the first reference block.

In an embodiment, the video decoding method may further include: reading reference block mode information from the encoded data, and performing, when the reference block mode information represents that decoding is performed by using a second fused reference block, the step of obtaining one or more second reference blocks matching the first reference block, to perform image fusion according to the one or more second reference blocks, and obtain the second fused reference block. Decoding is performed according to the second fused reference block. If the reference block mode information represents that decoding is performed by using the first reference block, the encoded data is decoded according to the first reference block.

In an embodiment, the decoding the encoded data according to the first reference block and the one or more second reference blocks, to obtain a video image block corresponding to the current to-be-decoded block includes: performing image fusion according to the first reference block and the one or more second reference blocks, to obtain a first fused reference block; and decoding the encoded data according to the first fused reference block, to obtain the video image block corresponding to the current to-be-decoded block.

An image fusion method may be performed with reference to the method in step S502 in the video encoding method. Details are not described herein again. After the first fused reference block is obtained, the first fused reference block is used as a prediction block, to obtain a corresponding predicted value. A pixel value corresponding to the video image block is obtained according to a sum of the predicted value and the predicted residual in the encoded data.

Figure 10:
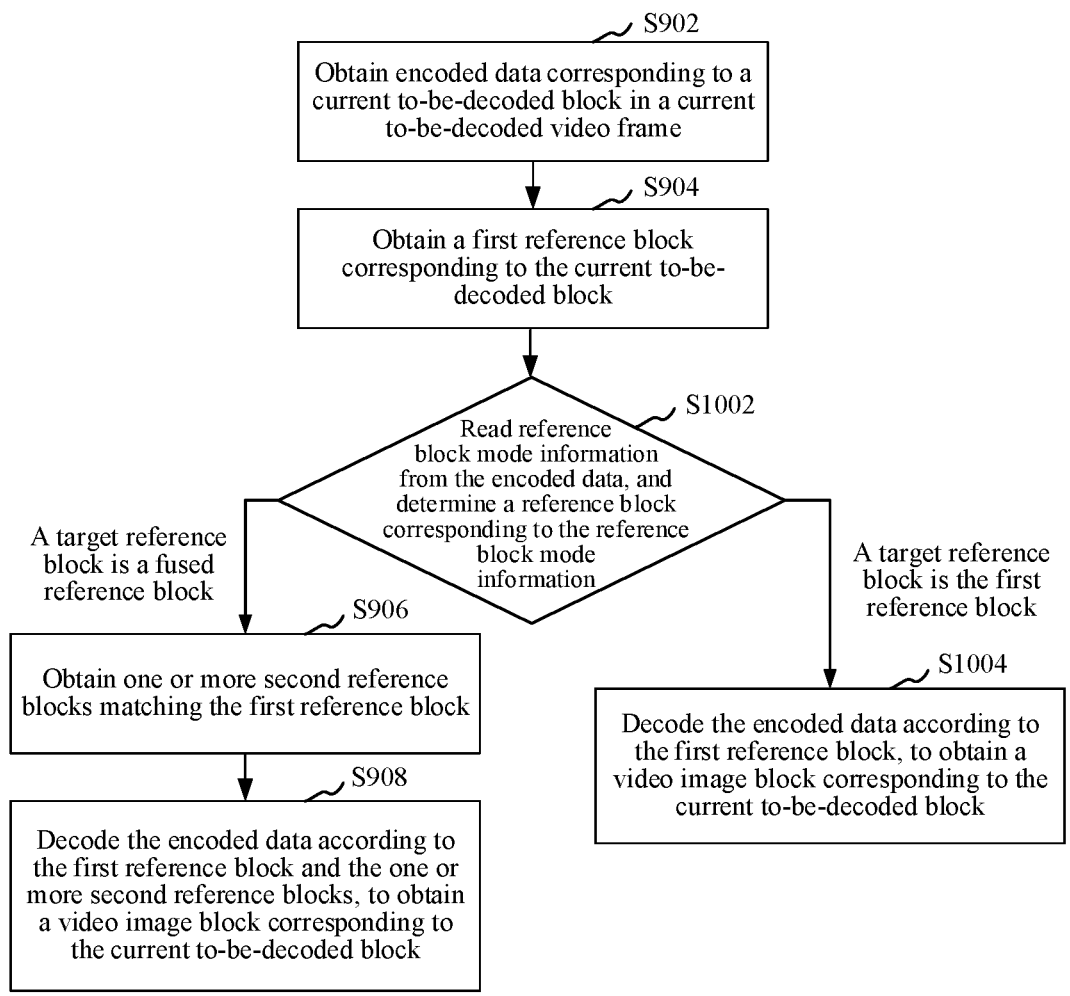
FIG. 10 is a flowchart of a video decoding method according to an embodiment.

In an embodiment, as shown in FIG. 10, the encoded data carries reference block mode information corresponding to a target reference block, and the video decoding method further includes the following steps:

Step S1002: Read the reference block mode information from the encoded data, and determine a reference block corresponding to the reference block mode information.

The encoded data carries the reference block mode information. When the reference block mode information represents that the first reference block is used as the target reference block, for example, when multi_prediction_flag is 1, step S1004 is performed. When the reference block mode information represents that the first fused reference block is used as the target reference block, for example, when multi_prediction_flag is 0, step S906 is performed. That is, the step of obtaining one or more second reference blocks matching the first reference block is performed, to decode the encoded data according to the first reference block and the one or more second reference blocks.

Step S1004: Decode the encoded data according to the first reference block.

If the reference block mode information represents that decoding is performed by using the first reference block, the first reference block may be used as the target reference block. A corresponding predicted value is obtained according to the first reference block as a prediction block, and a pixel value corresponding to the video image block is obtained according to a sum of the predicted value and the predicted residual in the encoded data.

It may be understood that the video encoding method and the video decoding method provided in the foregoing embodiments are described based on a process of video encoding by using the current encoded block and a process of video decoding by using the current to-be-decoded block. During actual encoding, the video encoding method provided in the embodiments of this application may be performed on encoded blocks having a prediction mode of inter-frame prediction, to obtain encoded data. Similarly, the video decoding method provided in this embodiment of this application is performed on a corresponding to-be-decoded block, to obtain a decoded image block. A decoded video frame is obtained according to decoded image blocks of each to-be-decoded video frame.

The video encoding method and the video decoding method provided in the embodiments of this application are described below by using an exemplary embodiment. It is assumed that there are 3 second reference blocks in a video encoding/decoding standard.

Figure 11:
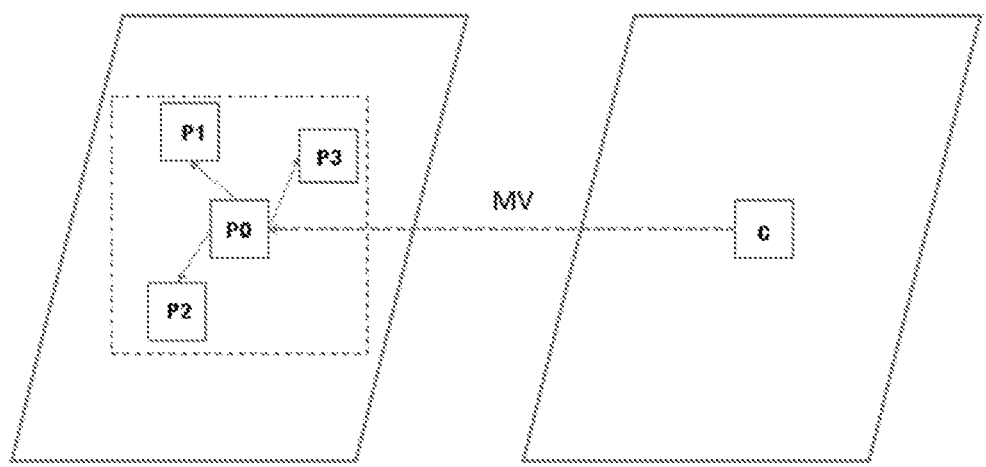
FIG. 11 is a schematic diagram of obtaining a first reference block and second reference blocks that correspond to a current encoded block according to an embodiment.

1. An encoder side obtains a current video frame in a video frame sequence, and it is assumed that the current video frame is the third video frame, and both the two previous video frames have been encoded. The current video frame is divided, and it is assumed that the current video frame is divided into 16 encoded blocks. The previous 9 encoded blocks have been encoded. Therefore, the tenth encoded block is used as a current encoded block. For example, an encoded block C in FIG. 11 is used as the current encoded block.

2. The encoder side performs motion search on two previous video frames of the current video frame, and obtains a block of which an SSE value with the current encoded block is smallest as a first reference block. For example, as shown in FIG. 11, the obtained first reference block is P0.

3. The encoder side obtains, from a square region having a position at which the first reference block is located as a center and having a side length of 50 pixels, three previous image blocks of which SSE values with the first reference block are smallest as second reference blocks. As shown in FIG. 11, the obtained second reference blocks are P1, P2, and P3.

4. The encoder side obtains weights corresponding to P0, P1, P2, and P3, and weights P0, P1, P2, and P3 according to weighting weights to obtain a first fused reference block. Assuming that preset weights are respectively 0.7, 0.1, 0.1, and 0.1, the first fused reference block Pw=P0*0.7+P1*0.1+P2*0.1+P3*0.1.

5. After obtaining the first fused reference block Pw, the encoder side calculates a difference degree between Pw and C, and calculates a difference degree between P0 and C. A reference block corresponding to a lower difference degree is selected from the first fused reference block and the first reference block as a selected target reference block. The difference degree between Pw and C is lower than that between P0 and C, so that the first fused reference block Pw is used as the target reference block.

6. The encoder side encodes the current encoded block C by using the first fused reference block, to obtain corresponding encoded data. The encoded data further carries 1-bit syntactic element information and motion vector (MV) information corresponding to the first reference block P0. The syntactic element information multi_prediction_flag may be 0, which represents that reference block mode information indicating that the first fused reference block is selected as the target reference block.

7. The encoder side transmits the encoded data to a decoder side. The decoder side obtains the encoded data corresponding to a current to-be-decoded block.

8. The decoder side obtains the first reference block P0 corresponding to the current to-be-decoded block according to the MV information carried in the encoded data.

9. The decoder side extracts, from the encoded data, the syntactic element information representing the reference block mode information, to obtain the reference block mode information indicating that the first fused reference block is selected as the target reference block. Step 10 is performed. Otherwise, the first reference block is directly used for decoding.

10. The decoder side obtains the second reference blocks P1, P2, and P3 matching the first reference block.

11. The decoder side obtains the preset weights corresponding to P0, P1, P2, and P3, which are respectively 0.7, 0.1, 0.1, and 0.1. The first fused reference block Pw=P0*0.7+P1*0.1+P2*0.1+P3*0.1 is obtained.

12. The decoder side decodes the encoded data according to the first fused reference block Pw, to obtain a video image block corresponding to the current to-be-decoded block.

Figure 12:
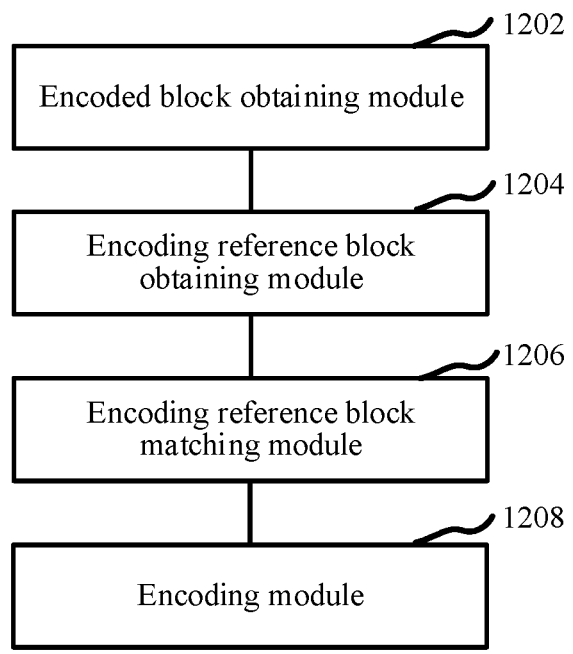
FIG. 12 is a structural block diagram of a video encoding apparatus according to an embodiment.

As shown in FIG. 12, in an embodiment, a video encoding apparatus is provided. The video encoding apparatus may be integrated in the foregoing terminal 110 and the server 120, and may include an encoded block obtaining module 1202, an encoding reference block obtaining module 1204, an encoding reference block matching module 1206, and an encoding module 1208. In this application, the term "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof.

The encoded block obtaining module 1202 is configured to obtain a to-be-encoded current encoded block in a current video frame.

The encoding reference block obtaining module 1204 is configured to obtain a first reference block corresponding to the current encoded block.

The encoding reference block matching module 1206 is configured to obtain one or more second reference blocks matching the first reference block, the one or more second reference blocks and the first reference block being similar reference blocks.

The encoding module 1208 is configured to encode the current encoded block according to the first reference block and the one or more second reference blocks, to obtain encoded data.

In an embodiment, the encoding reference block matching module 1206 is configured to obtain, according to a matching algorithm consistent with that of a decoder side, one or more second reference blocks matching the first reference block, the matching algorithm consistent with that of the decoder side including consistent reference block obtaining regions and consistent matching rules.

In an embodiment, the encoding reference block matching module 1206 includes:

a candidate reference block obtaining unit, configured to obtain a plurality of candidate reference blocks corresponding to the first reference block;

a first difference degree calculation unit, configured to calculate first difference degrees between the first reference block and the candidate reference blocks; and a second reference block obtaining unit, configured to obtain, according to the first difference degrees and from the plurality of candidate reference blocks, one or more second reference blocks matching the first reference block.

In an embodiment, the encoding module 1208 is configured to: perform image fusion according to the first reference block and the one or more second reference blocks, to obtain a first fused reference block; and encode the current encoded block according to the first fused reference block, to obtain the encoded data.

In an embodiment, the encoding module 1208 is configured to: perform image fusion according to the first reference block and the one or more second reference blocks, to obtain a first fused reference block; and select a target reference block from the first fused reference block and the first reference block, and encode the current encoded block according to the target reference block, to obtain the encoded data, the encoded data carrying reference block mode information corresponding to the target reference block.

In an embodiment, the encoding module 1208 is configured to: perform, in a case that there are a plurality of second reference blocks, image fusion according to the plurality of second reference blocks, to obtain a second fused reference block; and select a target reference block from the second fused reference block and the first reference block, and encode the current encoded block according to the target reference block, to obtain the encoded data, the encoded data carrying reference block mode information corresponding to the target reference block.

In an embodiment, the encoding module 1208 is configured to: obtain weighting weights that correspond to the first reference block and the one or more second reference blocks; and weight the first reference block and the one or more second reference blocks according to the weighting weights, to obtain the first fused reference block.

In an embodiment, the encoding module 1208 is configured to: calculate second difference degrees between the one or more second reference blocks and the first reference block; and obtain weighting weights corresponding to the one or more second reference blocks according to the second difference degrees, where the weighting weights corresponding to the one or more second reference blocks and the corresponding second difference degrees are in a negative correlation.

In an embodiment, the encoding module 1208 is configured to: calculate a third difference degree between the first fused reference block and the current encoded block, and calculate a fourth difference degree between the first reference block and the current encoded block; and select the target reference block according to magnitudes of the third difference degree and the fourth difference degree.

In an embodiment, the encoding module 1208 is configured to: calculate a corresponding first rate-distortion cost according to the first fused reference block and the current encoded block, and calculate a corresponding second rate-distortion cost according to the first reference block and the current encoded block; and select the target reference block according to magnitudes of the first rate-distortion cost and the second rate-distortion cost.

Figure 13:
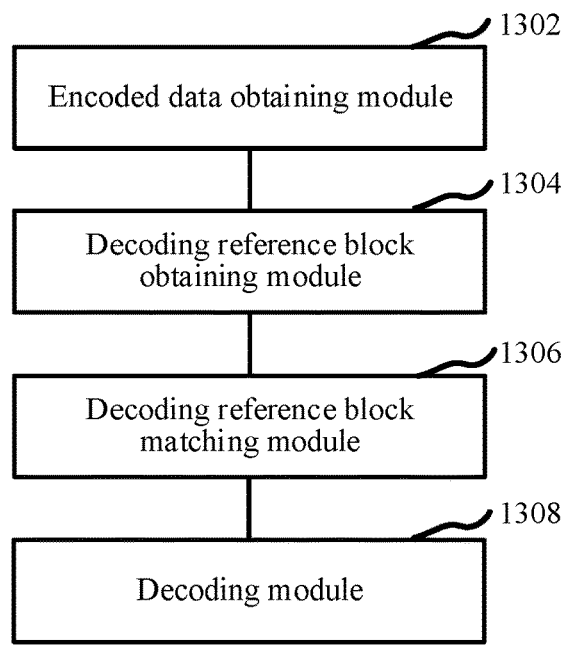
FIG. 13 is a structural block diagram of a video decoding apparatus according to an embodiment.

As shown in FIG. 13, in an embodiment, a video decoding apparatus is provided. The video decoding apparatus may be integrated in the foregoing terminal 110 and the server 120, and may include an encoded data obtaining module 1302, a decoding reference block obtaining module 1304, a decoding reference block matching module 1306, and a decoding module 1308.

The encoded data obtaining module 1302 is configured to obtain encoded data corresponding to a current to-be-decoded block in a to-be-decoded video frame.

The decoding reference block obtaining module 1304 is configured to obtain a first reference block corresponding to the current to-be-decoded block.

The decoding reference block matching module 1306 is configured to obtain one or more second reference blocks matching the first reference block, the one or more second reference blocks and the first reference block being similar reference blocks.

The decoding module 1308 is configured to decode the encoded data according to the first reference block and the one or more second reference blocks, to obtain a video image block corresponding to the current to-be-decoded block.

In an embodiment, the decoding reference block matching module 1306 is configured to obtain, according to a matching algorithm consistent with that of an encoder side, one or more second reference blocks matching the first reference block, the matching algorithm consistent with that of the encoder side including consistent reference block obtaining regions and consistent matching rules.

In an embodiment, the decoding reference block matching module 1306 is configured to: obtain a plurality of candidate reference blocks corresponding to the first reference block; calculate first difference degrees between the first reference block and the candidate reference blocks; and obtain, according to the first difference degrees and from the plurality of candidate reference blocks, one or more second reference blocks matching the first reference block.

In an embodiment, the decoding module 1308 is configured to: perform image fusion according to the first reference block and the one or more second reference blocks, to obtain a first fused reference block; and decode the encoded data according to the first fused reference block, to obtain the video image block corresponding to the current to-be-decoded block.

In an embodiment, the encoded data carries reference block mode information corresponding to a target reference block, and the decoding apparatus further includes:

a mode information obtaining module, configured to read reference block mode information from the encoded data; and an execution module, configured to: decode the encoded data according to the first reference block in a case that the reference block mode information represents that the first reference block is used as the target reference block, and perform, in a case that the reference block mode information represents that the first fused reference block is used as the target reference block, the operation of obtaining one or more second reference blocks matching the first reference block.

Figure 14:
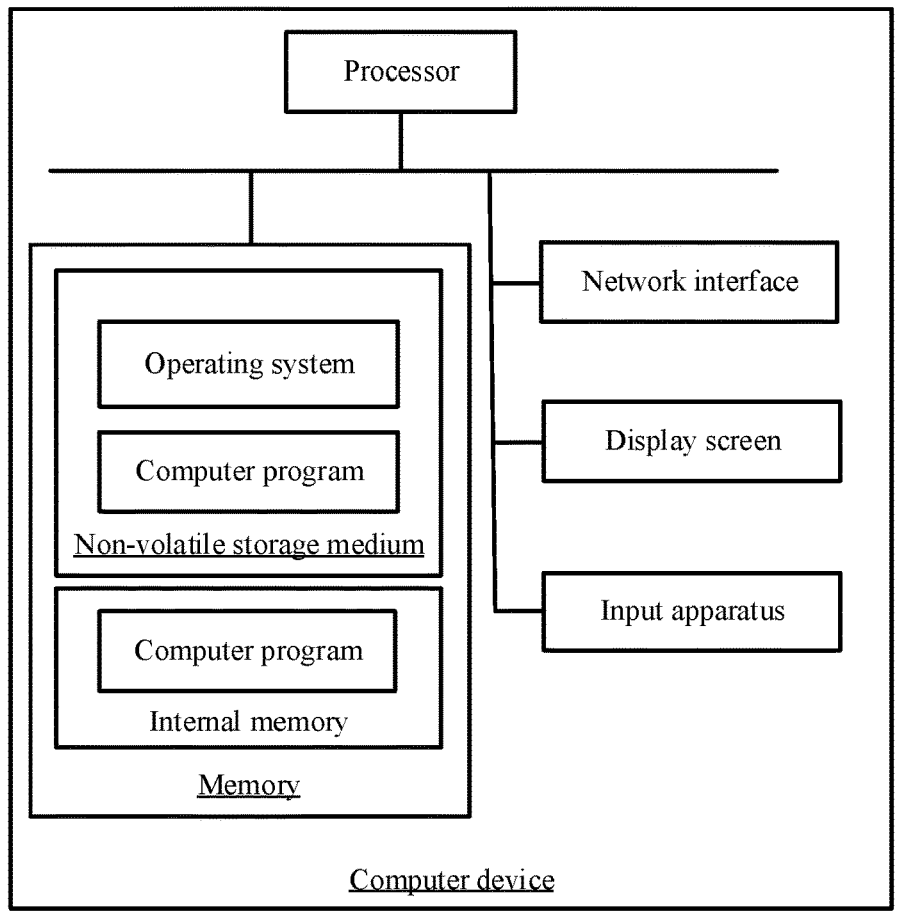
FIG. 14 is a block diagram of an internal structure of a computer device according to an embodiment.

FIG. 14 is a diagram of an internal structure of a computer device according to an embodiment. The computer device may be the terminal 110 in FIG. 1. As shown in FIG. 14, the computer device includes a processor, a memory, a network interface, an input apparatus, and a display screen that are connected by using a system bus. The memory includes a non-volatile storage medium and an internal memory. The non-volatile storage medium of the computer device stores an operating system, and may further store a computer program. The computer program, when executed by the processor, may cause the processor to implement at least one of the video encoding method and the video decoding method. The internal memory may also store a computer program. When executed by the processor, the computer program may cause the processor to perform at least one of the video encoding method and the video decoding method. The display screen of the computer device may be a liquid crystal display screen or an e-ink display screen. The input apparatus of the computer device may be a touch layer covering the display screen, or may be a button, a trackball, or a touchpad disposed on a housing of the computer device, or may be an external keyboard, touchpad, a mouse, or the like.

Figure 15:
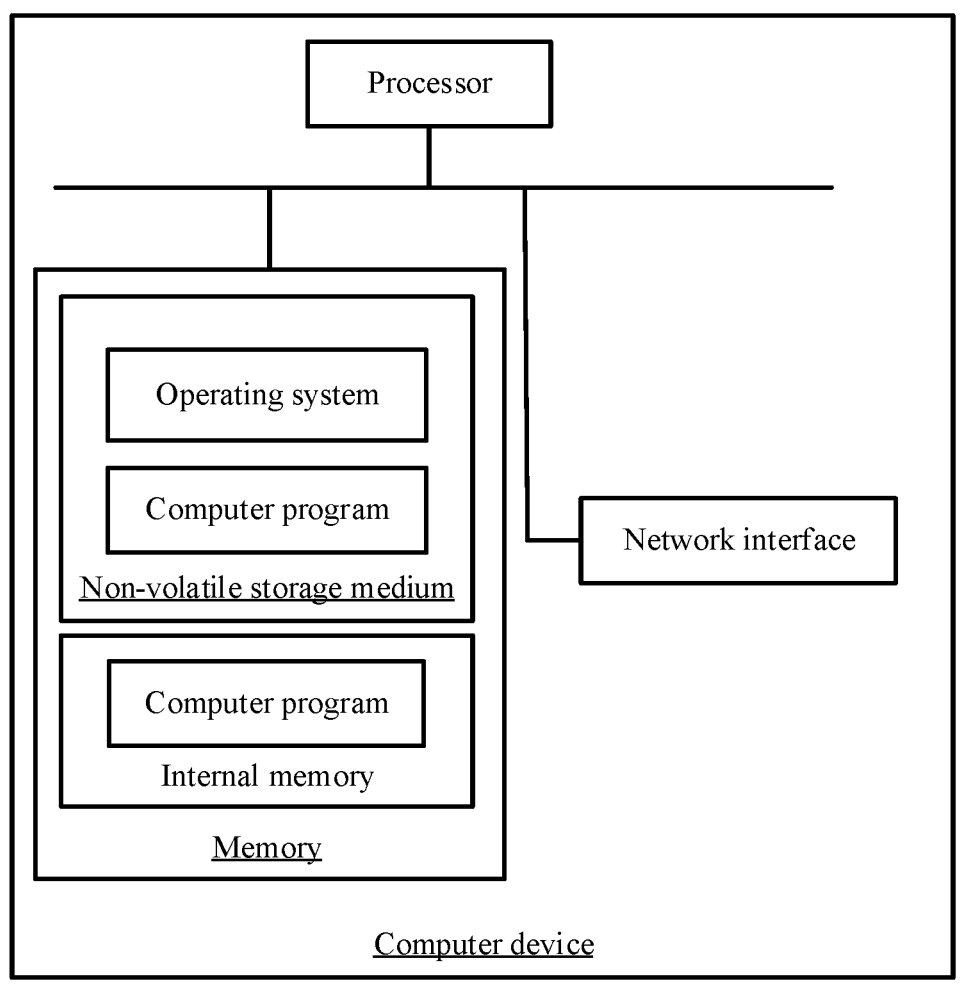
FIG. 15 is a block diagram of an internal structure of a computer device according to an embodiment.

FIG. 15 is a diagram of an internal structure of a computer device according to an embodiment. The computer device may be the server 12 in FIG. 1. As shown in FIG. 15, the computer device includes a processor, a memory, and a network interface that are connected by using a system bus. The memory includes a non-volatile storage medium and an internal memory. The non-volatile storage medium of the computer device stores an operating system, and may further store a computer program. The computer program, when executed by the processor, may cause the processor to implement at least one of the video encoding method and the video decoding method. The internal memory may also store a computer program. When executed by the processor, the computer program may cause the processor to perform at least one of the video encoding method and the video decoding method.

A person skilled in the art may understand that the structures shown in FIG. 14 and FIG. 15 are only block diagrams of a partial structure related to the solution of this application, and does not constitute a limitation to the computer device to which the solution of this application is applied. Specifically, the computer device may include more or fewer components than those shown in the figure, or some components may be combined, or a different component deployment may be used.

In an embodiment, the video encoding apparatus provided in this application may be implemented in a form of a computer program. The computer program may run on the computer device shown in FIG. 14 or FIG. 15. The memory of the computer device may store various program modules that form the video encoding apparatus, for example, the encoded block obtaining module 1202, the encoding reference block obtaining module 1204, the encoding reference block matching module 1206, and the encoding module 1208 that are shown in FIG. 12. The computer program formed by the program modules causes the processor to perform the steps in the video encoding method described in the embodiments of this application in this specification.

For example, the computer device shown in FIG. 14 or FIG. 15 may obtain a to-be-encoded current encoded block in a current video frame by using the encoded block obtaining module 1202 in the video encoding apparatus shown in FIG. 12; obtain a first reference block corresponding to the current encoded block by using the encoding reference block obtaining module 1204; obtain one or more second reference blocks matching the first reference block by using the encoding reference block matching module 1206, the one or more second reference blocks and the first reference block being similar reference blocks; and encode the current encoded block according to the first reference block and the one or more second reference blocks by using the encoding module 1208, to obtain encoded data.

In an embodiment, the video decoding apparatus provided in this application may be implemented in a form of a computer program. The computer program may run on the computer device shown in FIG. 14 or FIG. 15. The memory of the computer device may store various program modules that form the video decoding apparatus, for example, the encoded data obtaining module 1302, the decoding reference block obtaining module 1304, the decoding reference block matching module 1306, and the decoding module 1308 that are shown in FIG. 13. The computer program formed by the program modules causes the processor to perform the steps in the video decoding method described in the embodiments of this application in this specification.

For example, the computer device shown in FIG. 14 or FIG. 15 may obtain encoded data corresponding to a current to-be-decoded block in a to-be-decoded video frame by using the encoded data obtaining module 1302 in the video decoding apparatus shown in FIG. 13; obtain a first reference block corresponding to the current to-be-decoded block by using the decoding reference block obtaining module 1304; obtains one or more second reference blocks matching the first reference block by using the decoding reference block matching module 1306, the one or more second reference blocks and the first reference block being similar reference blocks; and decode the encoded data according to the first reference block and the one or more second reference blocks by using the decoding module 1308, to obtain a video image block corresponding to the current to-be-decoded block.

In an embodiment, a computer device is provided, and includes a memory and a processor, the memory storing a computer program, the computer program, when executed by the processor, causing the processor to perform the following steps:

obtaining a to-be-encoded current encoded block in a current video frame;

obtaining a first reference block corresponding to the current encoded block;

obtaining one or more second reference blocks matching the first reference block, the one or more second reference blocks and the first reference block being similar reference blocks; and encoding the current encoded block according to the first reference block and the one or more second reference blocks, to obtain encoded data.

In an embodiment, the computer program, when executed by the processor, causes the processor to perform the following step:

obtaining, according to a matching algorithm consistent with that of a decoder side, one or more second reference blocks matching the first reference block, the matching algorithm consistent with that of the decoder side including consistent reference block obtaining regions and consistent matching rules.

In an embodiment, the computer program, when executed by the processor, causes the processor to perform the following steps:

obtaining a plurality of candidate reference blocks corresponding to the first reference block;

calculating first difference degrees between the first reference block and the candidate reference blocks; and obtaining, according to the first difference degrees and from the plurality of candidate reference blocks, one or more second reference blocks matching the first reference block.

In an embodiment, the computer program, when executed by the processor, causes the processor to perform the following steps:

performing image fusion according to the first reference block and the one or more second reference blocks, to obtain a first fused reference block; and encoding the current encoded block according to the first fused reference block, to obtain the encoded data.

In an embodiment, the computer program, when executed by the processor, causes the processor to perform the following steps:

performing image fusion according to the first reference block and the one or more second reference blocks, to obtain a first fused reference block; and selecting a target reference block from the first fused reference block and the first reference block, and encoding the current encoded block according to the target reference block, to obtain the encoded data, the encoded data carrying reference block mode information corresponding to the target reference block.

In an embodiment, the computer program, when executed by the processor, causes the processor to perform the following steps:

performing, in a case that there are a plurality of second reference blocks, image fusion according to the plurality of second reference blocks, to obtain a second fused reference block; and selecting a target reference block from the second fused reference block and the first reference block, and encoding the current encoded block according to the target reference block, to obtain the encoded data, the encoded data carrying reference block mode information corresponding to the target reference block.

In an embodiment, the computer program, when executed by the processor, causes the processor to perform the following steps:

obtaining weighting weights that correspond to the first reference block and the one or more second reference blocks; and weighting the first reference block and the one or more second reference blocks according to the weighting weights, to obtain the first fused reference block.

In an embodiment, the computer program, when executed by the processor, causes the processor to perform the following steps:

calculating second difference degrees between the one or more second reference blocks and the first reference block; and obtaining weighting weights corresponding to the one or more second reference blocks according to the second difference degrees, where the weighting weights corresponding to the one or more second reference blocks and the corresponding second difference degrees are in a negative correlation.

In an embodiment, the computer program, when executed by the processor, causes the processor to perform the following steps:

calculating a third difference degree between the first fused reference block and the current encoded block, and calculating a fourth difference degree between the first reference block and the current encoded block; and selecting the target reference block according to magnitudes of the third difference degree and the fourth difference degree.

In an embodiment, the computer program, when executed by the processor, causes the processor to perform the following steps:

calculating a corresponding first rate-distortion cost according to the first fused reference block and the current encoded block, and calculating a corresponding second rate-distortion cost according to the first reference block and the current encoded block; and selecting the target reference block according to magnitudes of the first rate-distortion cost and the second rate-distortion cost.

In an embodiment, a computer device is further provided, and includes a memory and a processor, the memory storing a computer program, the computer program, when executed by the processor, causing the processor to perform the following steps:

obtaining encoded data corresponding to a current to-be-decoded block in a to-be-decoded video frame;

obtaining a first reference block corresponding to the current to-be-decoded block;

obtaining one or more second reference blocks matching the first reference block, the one or more second reference blocks and the first reference block being similar reference blocks; and decoding the encoded data according to the first reference block and the one or more second reference blocks, to obtain a video image block corresponding to the current to-be-decoded block.

In an embodiment, the computer program, when executed by the processor, causes the processor to perform the following step:

obtaining, according to a matching algorithm consistent with that of an encoder side, one or more second reference blocks matching the first reference block, the matching algorithm consistent with that of the encoder side including consistent reference block obtaining regions and consistent matching rules.

In an embodiment, the computer program, when executed by the processor, causes the processor to perform the following steps:

obtaining a plurality of candidate reference blocks corresponding to the first reference block;

calculating first difference degrees between the first reference block and the candidate reference blocks; and obtaining, according to the first difference degrees and from the plurality of candidate reference blocks, one or more second reference blocks matching the first reference block.

In an embodiment, the computer program, when executed by the processor, causes the processor to perform the following steps:

performing image fusion according to the first reference block and the one or more second reference blocks, to obtain a first fused reference block; and decoding the encoded data according to the first fused reference block, to obtain the video image block corresponding to the current to-be-decoded block.

In an embodiment, the computer program, when executed by the processor, causes the processor to perform the following steps:

reading reference block mode information from the encoded data; and decoding the encoded data according to the first reference block in a case that the reference block mode information represents that the first reference block is used as the target reference block, and performing, in a case that the reference block mode information represents that the first fused reference block is used as the target reference block, the operation of obtaining one or more second reference blocks matching the first reference block.

In an embodiment, a computer-readable storage medium is provided, and stores a computer program, the computer program, when executed by a processor, causing the processor to perform the steps in one or more of the foregoing video encoding method and video decoding method. The steps in the video encoding method and the video decoding method herein may be steps in the video encoding method and the video decoding method in the foregoing embodiments.

It is to be understood that although the steps in the flowcharts of the embodiments of this application are displayed in sequence according to arrows, the steps are not necessarily performed in the sequence indicated by the arrows. Unless explicitly specified in this specification, the sequence for performing the steps is not strictly limited, and the steps may be performed in other sequences. Moreover, at least some of the steps in each embodiment may include a plurality of sub-steps or a plurality of stages. The sub-steps or stages are not necessarily performed at the same moment but may be performed at different moments. The sub-steps or stages are not necessarily performed sequentially, but may be performed in turn or alternately with another step or at least some of sub-steps or stages of the another step.

A person of ordinary skill in the art may understand that all or some of the processes of the methods in the embodiments may be implemented by a computer program instructing relevant hardware. The computer program may be stored in a non-volatile computer-readable storage medium. When the computer program is executed, the processes of the foregoing method embodiments may be performed. Any reference to a memory, a storage, a database, or another medium used in the various embodiments provided in this application may include a non-volatile and/or volatile memory. The non-volatile memory may include a read-only memory (ROM), a programmable ROM (PROM), an electrically programmable ROM (EPROM), an electrically erasable programmable ROM (EEPROM), or a flash. The volatile memory may include a random access memory (RAM) or an external cache. For the purpose of description instead of limitation, the RAM is available in a plurality of forms, such as a static RAM (SRAM), a dynamic RAM (DRAM), a synchronous DRAM (SDRAM), a double data rate SDRAM (DDRSDRAM), an enhanced SDRAM (ESDRAM), a synchlink DRAM (SLDRAM), a Rambus direct RAM (RDRAM), a direct Rambus dynamic RAM (DRDRAM), and a Rambus dynamic RAM (RDRAM).

Various technical features in the foregoing embodiments may be combined randomly. For a concise description, possible combinations of various technical features in the foregoing embodiments are not all described. However, the combinations of the technical features are to be considered as falling within the scope recorded in this specification provided that the combinations of the technical features do not conflict with each other.

The foregoing embodiments only show several implementations of this application, and descriptions thereof are in detail, but are to be not construed as limitation to the patent scope of this application. A person of ordinary skill in the art may further make several variations and improvements without departing from the ideas of this application, and such variations and improvements all fall within the protection scope of this application. Therefore, the protection scope of this application shall be subject to the protection scope of the appended claims.

What is claimed is:

1. A video encoding method, applied to a computer device having a processor and memory storing a plurality of computer programs to be executed by the processor, the method comprising:
    obtaining a to-be-encoded current block in a current video frame;
    obtaining a first reference block corresponding to the current block in a reference video frame;
    obtaining, within the reference video frame, one or more second reference blocks matching the first reference block, the one or more second reference blocks and the first reference block being similar reference blocks; and
    encoding the current block according to the first reference block and the one or more second reference blocks, to obtain encoded data, including:
        performing image fusion according to the first reference block and the one or more second reference blocks, to obtain a first fused reference block; and
        selecting a target reference block from the first fused reference block and the first reference block; and
        encoding the current block according to the target reference block, to obtain the encoded data, the encoded data carrying reference block mode information corresponding to the target reference block.

2. The method according to claim 1, wherein obtaining the one or more second reference blocks matching the first reference block comprises:
    obtaining, according to a matching algorithm consistent with that of a decoder side, one or more second reference blocks matching the first reference block, the matching algorithm consistent with that of the decoder side comprising consistent reference block obtaining regions and consistent matching rules.

3. The method according to claim 1, wherein obtaining the one or more second reference blocks matching the first reference block comprises:
    obtaining, within the reference video frame, a plurality of candidate reference blocks corresponding to the first reference block;
    calculating first difference degrees between the first reference block and the candidate reference blocks; and
    obtaining, according to the first difference degrees and from the plurality of candidate reference blocks, one or more second reference blocks matching the first reference block.

4. The method according to claim 1, wherein encoding the current block further comprises:
    encoding the current block according to the first fused reference block, to obtain the encoded data.

5. The method according to claim 1, wherein performing the image fusion comprises:
    obtaining weighting weights that correspond to the first reference block and the one or more second reference blocks; and
    weighting the first reference block and the one or more second reference blocks according to the weighting weights, to obtain the first fused reference block.

6. The method according to claim 5, wherein obtaining the weighting weights that correspond to the first reference block and the one or more second reference blocks comprises:
    calculating second difference degrees between the one or more second reference blocks and the first reference block; and
    obtaining weighting weights corresponding to the one or more second reference blocks according to the second difference degrees, wherein the weighting weights corresponding to the one or more second reference blocks and the corresponding second difference degrees are in a negative correlation.

7. The method according to claim 1, wherein selecting the target reference block from the first fused reference block and the first reference block comprises:
    calculating a third difference degree between the first fused reference block and the current block, and calculating a fourth difference degree between the first reference block and the current block; and
    selecting the target reference block according to magnitudes of the third difference degree and the fourth difference degree.

8. The method according to claim 1, wherein selecting the target reference block from the first fused reference block and the first reference block comprises:
    calculating a corresponding first rate-distortion cost according to the first fused reference block and the current block, and calculating a corresponding second rate-distortion cost according to the first reference block and the current block; and
    selecting the target reference block according to magnitudes of the first rate-distortion cost and the second rate-distortion cost.

9. A computer device, comprising:
    a processor; and
    memory, the memory storing a plurality of computer programs that, when executed by the processor, cause the computer device to perform a plurality of operations including:
    obtaining a to-be-encoded current block in a current video frame;
    obtaining a first reference block corresponding to the current block in a reference video frame;
    obtaining, within the reference video frame, one or more second reference blocks matching the first reference block, the one or more second reference blocks and the first reference block being similar reference blocks; and encoding the current block according to the first reference block and the one or more second reference blocks, to obtain encoded data, including:
- performing image fusion according to the first reference block and the one or more second reference blocks, to obtain a first fused reference block; and
- selecting a target reference block from the first fused reference block and the first reference block; and
- encoding the current block according to the target reference block, to obtain the encoded data, the encoded data carrying reference block mode information corresponding to the target reference block.

10. The computer device according to claim 9, wherein obtaining the one or more second reference blocks comprises:
- obtaining, according to a matching algorithm consistent with that of a decoder side, one or more second reference blocks matching the first reference block, the matching algorithm consistent with that of the decoder side comprising consistent reference block obtaining regions and consistent matching rules.

11. The computer device according to claim 9, wherein obtaining the one or more second reference blocks comprises:
- obtaining a plurality of candidate reference blocks corresponding to the first reference block;
- calculating first difference degrees between the first reference block and the candidate reference blocks; and
- obtaining, according to the first difference degrees and from the plurality of candidate reference blocks, one or more second reference blocks matching the first reference block.

12. The computer device according to claim 9, wherein encoding the current block comprises:
- encoding the current block according to the first fused reference block, to obtain the encoded data.

13. The computer device according to claim 12, wherein performing the image fusion comprises:
- obtaining weighting weights that correspond to the first reference block and the one or more second reference blocks; and
- weighting the first reference block and the one or more second reference blocks according to the weighting weights, to obtain the first fused reference block.

14. A non-transitory computer-readable storage medium, storing a plurality of computer programs, the plurality of computer programs, when executed by a processor of a computer device, causing the computer device to perform a plurality of operations including:
- obtaining a to-be-encoded current block in a current video frame;
- obtaining a first reference block corresponding to the current block in a reference video frame;
- obtaining, within the reference video frame, one or more second reference blocks matching the first reference block, the one or more second reference blocks and the first reference block being similar reference blocks; and
- encoding the current block according to the first reference block and the one or more second reference blocks, to obtain encoded data, including:
  - performing image fusion according to the first reference block and the one or more second reference blocks, to obtain a first fused reference block; and
  - selecting a target reference block from the first fused reference block and the first reference block; and
  - encoding the current block according to the target reference block, to obtain the encoded data, the encoded data carrying reference block mode information corresponding to the target reference block.

15. The non-transitory computer-readable storage medium according to claim 14, wherein obtaining the one or more second reference blocks matching the first reference block comprises:
- obtaining, according to a matching algorithm consistent with that of a decoder side, one or more second reference blocks matching the first reference block, the matching algorithm consistent with that of the decoder side comprising consistent reference block obtaining regions and consistent matching rules.

16. The non-transitory computer-readable storage medium according to claim 14, wherein obtaining the one or more second reference blocks matching the first reference block comprises:
- obtaining a plurality of candidate reference blocks corresponding to the first reference block;
- calculating first difference degrees between the first reference block and the candidate reference blocks; and
- obtaining, according to the first difference degrees and from the plurality of candidate reference blocks, one or more second reference blocks matching the first reference block.

17. The non-transitory computer-readable storage medium according to claim 14, wherein encoding the current encoded block comprises:
- encoding the current encoded block according to the first fused reference block, to obtain the encoded data.

* * * * *